(12) United States Patent
Liu et al.

(10) Patent No.: US 12,425,605 B2
(45) Date of Patent: Sep. 23, 2025

(54) IMAGE IN-PAINTING FOR IRREGULAR HOLES USING PARTIAL CONVOLUTIONS

(71) Applicant: NVIDIA Corporation, Santa Clara, CA (US)

(72) Inventors: Guilin Liu, San Jose, CA (US); Fitsum A. Reda, Santa Clara, CA (US); Kevin Shih, Santa Clara, CA (US); Ting-Chun Wang, San Jose, CA (US); Andrew Tao, Los Altos, CA (US); Bryan Catanzaro, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/360,895

(22) Filed: Mar. 21, 2019

(65) Prior Publication Data

US 2019/0295228 A1 Sep. 26, 2019

Related U.S. Application Data

(60) Provisional application No. 62/646,309, filed on Mar. 21, 2018.

(51) Int. Cl.
*G06K 9/00* (2022.01)
*G06N 3/045* (2023.01)
(Continued)

(52) U.S. Cl.
CPC ........... *H04N 19/139* (2014.11); *G06N 3/045* (2023.01); *G06N 3/08* (2013.01); *G06N 20/10* (2019.01);
(Continued)

(58) Field of Classification Search
CPC ........... G06T 5/005; G06T 2207/20081; G06T 2207/20084; G06N 3/0464;
(Continued)

(56) References Cited

U.S. PATENT DOCUMENTS 10,262,224 B1 4/2019 Harguess et al.
2008/0240241 A1 10/2008 Mishima et al.
(Continued)

OTHER PUBLICATIONS

Pascal Laube, Michael Grunwald, Matthias O. Franz & Georg Umlauf, Image Inpainting for High-Resolution Textures Using CNN Texture Synthesis, Institute for Optical Systems, University of Applied Sciences Constance, Germany, pp. 1-5 , Feb. 12, 2018 (Year: 2018).*

(Continued)

*Primary Examiner* — Atiba O Fitzpatrick
(74) *Attorney, Agent, or Firm* — Davis Wright Tremaine LLP

(57) ABSTRACT

A neural network architecture is disclosed for performing image in-painting using partial convolution operations. The neural network processes an image and a corresponding mask that identifies holes in the image utilizing partial convolution operations, where the mask is used by the partial convolution operation to zero out coefficients of the convolution kernel corresponding to invalid pixel data for the holes. The mask is updated after each partial convolution operation is performed in an encoder section of the neural network. In one embodiment, the neural network is implemented using an encoder-decoder framework with skip links to forward representations of the features at different sections of the encoder to corresponding sections of the decoder.

20 Claims, 16 Drawing Sheets

(51) Int. Cl.

| | | |
|---|---|---|
| *G06N 3/08* | (2023.01) | |
| *G06N 20/10* | (2019.01) | |
| *G06N 20/20* | (2019.01) | |
| *G06T 3/4007* | (2024.01) | |
| *G06T 5/20* | (2006.01) | |
| *G06T 5/77* | (2024.01) | |
| *H04N 19/132* | (2014.01) | |
| *H04N 19/139* | (2014.01) | |
| *H04N 19/172* | (2014.01) | |
| *H04N 19/587* | (2014.01) | |

(52) U.S. Cl.
CPC ........... *G06N 20/20* (2019.01); *G06T 3/4007* (2013.01); *G06T 5/20* (2013.01); *G06T 5/77* (2024.01); *H04N 19/132* (2014.11); *H04N 19/172* (2014.11); *H04N 19/587* (2014.11); *G06T 2207/20081* (2013.01); *G06T 2207/20084* (2013.01)

(58) Field of Classification Search
CPC ....... G06N 3/02–126; G06N 20/00–20; G06K 9/6256; G06K 9/6257; G06K 9/6259; G06V 10/70; G06V 10/82; G06V 10/774–7796; G06F 18/214–2155; G06F 7/023; G06F 40/16
See application file for complete search history.

(56) References Cited

U.S. PATENT DOCUMENTS

| | | | |
|---|---|---|---|
| 2008/0266413 A1 | 10/2008 | Cohen et al. | |
| 2014/0254951 A1 | 9/2014 | Salvador et al. | |
| 2015/0324958 A1* | 11/2015 | Kokemohr | G06T 5/20 |
| | | | 382/263 |
| 2018/0137389 A1 | 5/2018 | Mathieu et al. | |
| 2018/0150947 A1* | 5/2018 | Lu | G06T 11/00 |
| 2018/0189424 A1 | 7/2018 | Boesch et al. | |
| 2018/0286055 A1 | 10/2018 | Lim et al. | |
| 2018/0300624 A1* | 10/2018 | El-Khamy | G06N 3/06 |
| 2018/0315159 A1* | 11/2018 | Ould-Ahmed-Vall | |
| | | | G06N 20/00 |
| 2019/0012774 A1 | 1/2019 | Arai | |
| 2019/0066733 A1 | 2/2019 | Somanath et al. | |
| 2019/0114748 A1* | 4/2019 | Lin | G06N 3/0454 |
| 2019/0114818 A1 | 4/2019 | Lin et al. | |
| 2019/0228508 A1* | 7/2019 | Price | G06T 7/337 |
| 2019/0261016 A1 | 8/2019 | Yuxin et al. | |
| 2019/0287283 A1* | 9/2019 | Lin | G06T 5/60 |
| 2019/0289321 A1 | 9/2019 | Liu et al. | |
| 2020/0012940 A1 | 1/2020 | Liu et al. | |
| 2020/0098139 A1* | 3/2020 | Kaplanyan | G06K 9/3233 |
| 2020/0250794 A1* | 8/2020 | Zimmer | G06T 3/4069 |
| 2020/0264327 A1* | 8/2020 | Gadylshin | G06N 3/04 |

OTHER PUBLICATIONS

U.S. Appl. No. 16/360,853, filed Mar. 21, 2019.
Iizuka, S., et al., "Globally and locally consistent image completion," ACM Transactions on Graphics (TOG) 36(4) (2017) 107.
Yu, J., et al., "Generative image inpainting with contextual attention," arXiv preprint arXiv:1801.07892 (2018).
Barnes, C., et al., "Patchmatch: A randomized correspondence algorithm for structural image editing," ACM Transactions on Graphics—TOG 28(3) (2009) 24.
Telea, A., et al., "An image inpainting technique based on the fast marching method," Journal of graphics tools 9(1) (2004) 23-24.
Perez, P., et al., "Poisson image editing," ACM Transactions on graphics (TOG) 22(3) (2003) 313-318.
Pathak, D., et al., "Context encoders: Feature learning by inpainting," Proceedings of the IEEE Conference on Computer Vision and Pattern Recognition, (2016) 2536-2544.
Yang, C., et al., "High-resolution image inpainting using multi-scale neural patch synthesis," The IEEE Conference on Computer Vision and Pattern Recognition (CVPR), vol. I (2017) 3.
Hays, J., et al., "Scene completion using millions of photographs," ACM Transactions on Graphics (TOG), vol. 26, ACM (2007) 4.
Harley, A.W., et al., "Segmentation-aware convolutional networks using local attention masks," 2017 IEEE International Conference on Computer Vision (ICCV) (2017) 5048-5057.
Ulyanov, D., et al., "Deep image prior," arXiv preprint arXiv:1711.10925 (2017).
Bertalmio, M., et al., "Image inpainting," Proceedings of the 27th annual conference on computer graphics and interactive techniques, ACM Press/Addison-Wesley Publishing Co. (2000) 417-424.
Ballester, C., et al., "Filling-in by joint interpolation of vector fields and gray levels," IEEE transactions on image processing 10(8) (2001) 1200-1211.
Efros, A.A., et al., "Image quilting for texture synthesis and transfer," Proceedings of the 28$^{th}$ annual conference on computer graphics and interactive techniques, ACM (2001) 341-346.
Kwatra, V., et al., "Texture optimization for example-based synthesis," ACM Transactions on Graphics (ToG), vol. 24, ACM (2005) 795-802.
Simakov, D., et al., "Summarizing visual data using bidirectional similarity," Computer Vision and Pattern Recognition, 2008. CVPR 2008. IEEE Conference on IEEE (2008) 1-8.
Russakovsky, O., et al., "ImageNet Large Scale Visual Recognition Challenge," International Journal of Computer Vision (IJCV) 115(3) (2015) 211-252.
Song, Y., et al., "Image inpainting using multi-scale feature image translation," arXiv preprint arXiv:1711.08590 (2017).
Yeh, R., et al., "Semantic image inpainting with perceptual and contextual losses," arXiv preprint arXiv:1607.07539 (2016).
Vandenoord, A., et al., "Conditional image generation with pixel cnn decoders," Advances in Neural Information Processing Systems (2016) 4790-4798.
Paszke, A., Automatic differentiation in pytorch (2017).
Ronneberger, O., et al., "U-Net: Convolutional networks for biomedical image segmentation," International Conference on Medical image computing and computer-assisted intervention, Springer (2015) 234-241.
Isola, P., et al., "Image-to-image translation with conditional adversarial networks," arXiv preprint (2017).
Knutsson, H., et al., "Normalized and differential convolution," Proceedings of IEEE Conference on Computer Vision and Pattern Recognition (Jun. 1993) 515-523.
Ioffe, S., et al., "Batch normaliziation: Accelerating deep network training by reducing internal covariate shift," International Conference on Machine Learning (2015) 448-456.
Gatys, L.A., et al., "A neural algorithm of artistic style," arXiv preprint arXiv:1508.06576 (2015).
Simonyan, K., et al., "Very deep Convolutional networks for large-scale image recognition," arXiv preprint arXiv:1409.1556 (2014).
Johnson, J., et al., "Perceptual losses for real-time style transfer and super-resolution," European Conference on Computer Vision, Springer (2016) 694-711.
Sundaram, N., et al., "Dense point trajectories by gpu-accelerated large displacement optical flow," European conference on computer vision, Springer (2010) 438-451.
Zhou, B., et al., Places: A 10 million image database for scene recognition. IEEE Transactions on Pattern Analysis and Machine Intelligence (2017).
Liu, Z., et al., "Deep learning face attributes in the wild," Proceedings of International Conference on Computer Vision (ICCV) (2015).
Karras, T., et al., "Progressive growing of gans for improved quality, stability, and variation," arXiv preprint arXiv:1710.10196 (2017).
He, K., et al., "Delving deep into rectifiers: Surpassing human-level performance on imagenet classficiation," Proceedings of the IEEE international conference on computer vision (2015) 1026-1034.
Kingma, D.P. et al., "A method for stochastic optimization." arXiv preprint arXiv:1412.6980 (2014).

(56) References Cited

OTHER PUBLICATIONS

Wang, Z., et al., "Image quality assessment: from error visibility to structural similarity," IEEE transactions on image processing 13(4) (2004) 600-612.
Salimans, T., "Improved techniques for training gans," Advances in Neural Information Processing Systems, (2016) 2234-2242.
Final Office Action issued in U.S. Appl. No. 16/360,853, dated May 3, 2021.
Non-Final Office Action issued in U.S. Appl. No. 16/360,853, dated Dec. 20, 2021.
Abu-El-Haija et al., "YouTube-8M: A Large-Scale Video Classification Benchmark," 2016, 10 pages.
Amersfoort et al., "Transformation-Based Models of Video Sequences," 2017, 11 pages.
Babaeizadeh et al., "Stochastic Variational Video Prediction," 2017, 12 pages.
Byeon et al., "ContextVP: Fully Context-Aware Video Prediction," 2018, 17 pages.
Denton et al., "Stochastic Video Generation with a Learned Prior," 2018, 12 pages.
Dollár et al., "Pedestrian Detection: An Evaluation of the State of the Art," IEEE Transactions on Pattern Analysis and Machine Intelligence, 2012, 20 pages.
Dollár et al., "Pedestrian Detection: A Benchmark," CVPR, Jun. 2009, 8 pages.
Fischer et al., "FlowNet: Learning Optical Flow with Convolutional Networks," Proceedings of the IEEE International Conference on Computer Vision, 2015, 9 pages.
Glorot et al., Understanding the Difficulty of Training Deep Feedforward Neural Networks, Proceedings of the Thirteenth International Conference on Artificial Intelligence and Statistics Proceedings of Machine Learning Research, vol. 9, 2010, 8 pages.
He et al., "Delving deep into rectifiers: Surpassing human-level performance on imagenet classification," Proceedings of the IEEE International Conference on Computer Vision, (2015).
IEEE, "IEEE Standard 754-2008 (Revision of IEEE Standard 754-1985): IEEE Standard for Floating-Point Arithmetic," Aug. 29, 2008, 70 pages.
Ilg, E., et al., "FlowNet 2.0: Evolution of Optical Flow Estimation with Deep Networks," IEEE Conference on Computer Vision and Pattern Recognition, 2017, 9 pages.
Jiang et al., "Super SloMo: High Quality Estimation of Multiple Intermediate Frames for Video Interpolation," IEEE Conference on Computer Vision and Pattern Recognition, 2018, 9 pages.
Johnson et al., "Perceptual Losses for Real-Time Style Transfer and Super-Resolution," Department of Computer Science, 2016, 17 pages.
Kajo et al., "Motion Estimation of Crowd Flow using Optical Flow Techniques: A Review," ICSPCS, 2015, 9 pages.
Kingma et al. "Adam: A Method for Stochastic Optimization," arXiv:1412.6980, dated Dec. 22, 2014, 9 pages.
Leibfried, et al., "A Deep Learning Approach for Joint Video Frame and Reward Prediction in Atari Games," ICML, 2017, 18 pages.
Liang et al., "Dual Motion GAN for Future-ow Embedded Video Prediction," Advances in Neural Information Processing Systems, 2017, 9 pages.
Liu et al., "Video Frame Synthesis using Deep Voxel Flow," IEEE International Conference on Computer Vision, Aug. 5, 2017, 9 pages.
Long et al., "Fully Convolutional Networks for Semantic Segmentation," CVPR, 2015, 10 pages.
Lotter et al., "Deep Predictive Coding Networks for Video Prediction and Unsupervised Learning," Aug. 31, 2016, 12 pages.
Luc et al., "Predicting Deeper into the Future of Semantic Segmentation," International Conference on Computer Vision, 2017, 10 pages.
Mahjourian et al., "Geometry-Based Next Frame Prediction from Monocular Video," Intelligent Vehicles Symposium, 2017, 8 pages.
Mathieu et al., "Deep Multi-Scale Video Prediction Beyond Mean Square Error," International Conference on earning Representations, 2016, 14 pages.
Milletari et al., "V-net: Fully Convolutional Neural Networks for Volumetric Medical Image Segmentation," 2016, Fourth International Conference on 3D Vision (3DV), Oct. 25, 2016, 11 pages.
Niklaus et al., "Video Frame Interpolation via Adaptive Convolution," CVPR, 2017, 10 pages.
Niklaus et al., "Video Frame Interpolation via Adaptive Separable Convolution," ICCV, 2017, 10 pages.
Odena et al., "Deconvolution and Checkerboard Artifacts," Distill, 2016, 10 pages.
Oliu et al., "Folded Recurrent Neural Networks for Future Video Prediction," 2018, 16 pages.
Paszke et al., "Automatic Differentiation in Pytorch," 2017, 4 pages.
Ranzato et al., "Video (Language) Modeling: A Baseline for Generative Models of Natural Videos," 2014, 15 pages.
Ronneberger et al., "U-net: Convolutional networks for biomedical image segmentation," International Conference on Medical Image Computing and Computer-Assisted Intervention, Oct. 5, 2015, 8 pages.
Simonyan et al., "Very Deep Convolutional Networks for Large-Scale Image Recognition," Apr. 10, 2015, 14 pages.
Srivastava et al., "Unsupervised Learning of Video Representations using LSTMs," International Conference on Machine Learning, 2015, 10 pages.
Sun et al., "PWC-Net: CNNs for Optical Flow Using Pyramid, Warping, and Cost Volume," CVPR, 2018, 10 pages.
Villegas et al., "Decomposing Motion and Content for Natural Video Sequence Prediction," ICLR, 2017, 22 pages.
Vondrick et al., "Generating the Future with Adversarial Transformers," IEEE Conference on Computer Vision and Pattern Recognition, 2017, 9 pages.
Vondrick et al., "Generating Videos with Scene Dynamics," 29th Conference on Neural Information Processing Systems, 2016, pp. 1-10.
Vukotic et al., "One-Step Time-Dependent Future Video Frame Prediction with a Convolutional Encoder-Decoder Neural Network," International Conference on Image Analysis and Processing, Springer, 2017, 11 pages.
Wang et al., "Image Quality Assessment: From Error Visibility to Structural Similarity," IEEE Transactions on Image Processing, 13(4): Apr. 2004, 14 pages.
Samsonov, Vladislav, "Deep Frame Interpolation", Moscow Institute of Physics and Technology, Department of Innovation and High Technology, Jun. 15, 2017, 1 page.

* cited by examiner

IMAGE IN-PAINTING FOR IRREGULAR HOLES USING PARTIAL CONVOLUTIONS

CLAIM OF PRIORITY

This application claims the benefit of U.S. Provisional Application No. 62/646,309 titled "Video Prediction using Spatially Displaced Convolution," filed Mar. 21, 2018, the entire contents of which is incorporated herein by reference.

TECHNICAL FIELD

The present disclosure relates to image in-painting techniques. More particularly, the present disclosure relates to pixel synthesis to fill irregular holes in an image using partial convolution operations implemented by a trained neural network.

BACKGROUND

Image in-painting is the task of filling in holes in an image with plausible pixel data and can be utilized in a variety of applications. For example, image in-painting can be utilized to remove unwanted content in images by clearing portions of the pixel data in an image and then creating synthesized pixel data to replace the unwanted content.

Many of the prior art solutions to the image in-painting problem do not use deep learning approaches and rely on image statistics in the rest of the image to fill the holes. These solutions may also rely on expensive post-processing to create plausible replacement pixel data. For example, the pixel values in a hole may be initialized using an average color value sampled from pixel data in the image and then blended using pixel values proximate the hole to synthesize the pixel values in the hole. These solutions are limited by the available image statistics and do not incorporate any concept of visual semantics.

More recent approaches to the image in-painting problem incorporate the concepts of visual semantics into the solution. For example, a neural network learns visual semantics for the image prior to performing the in-painting process in order to guide the post-processing steps. However, these approaches typically incorporate a fixed initial value for the pixels in the hole that tends to skew the results. Furthermore, these approaches typically rely on filling regularly shaped rectangular holes in the image. These approaches tend to produce artifacts that manifest as a lack of texture in the hole regions, obvious color contrasts, or artificial edge responses surrounding the hole regions. Thus, there is a need for addressing these issues and/or other issues associated with the prior art.

SUMMARY

A method, computer readable medium, and system are disclosed for implementing a deep learning neural network to perform image in-painting. The deep learning neural network model is trained to implement partial convolution operations that fill the holes in the image with synthesized pixel data. Each partial convolution operation utilizes a mask that identifies valid and invalid pixels in the image to zero out specific coefficients and normalize the remainder of the coefficients in the convolution kernel prior to the partial convolution operation. The mask is updated after each partial convolution operation.

In one embodiment, a method is disclosed for performing an image in-painting operation. The method includes the step of processing an input that includes an image and a mask that identifies one or more holes in the image by one or more layers of a neural network to generate a predicted image. At least one layer of the neural network is configured to perform a partial convolution operation on the image based on the mask. In one embodiment, the at least one layer is further configured to update the mask subsequent to the partial convolution operation. In some embodiments, updating the mask can include performing a convolution operation on the mask and normalizing a result of the convolution operation.

In one embodiment, the neural network includes an encoder section and a decoder section. Each stage of the decoder section is connected to an input of a corresponding stage of the encoder section via a skip link. In one embodiment, each stage of the decoder section comprises an up-sampling layer, a concatenation layer, and a partial convolution layer. The concatenation layer combines an output of the up-sampling layer with the input of the corresponding stage of the encoder section from the skip link. In one embodiment, the partial convolution layer is followed by either a Rectified Linear Unit or a Leaky Rectified Linear Unit.

In one embodiment, each stage of the encoder section includes a partial convolution layer configured to apply a convolution kernel to the image in the input. For each pixel of a feature map generated by the partial convolution layer, the coefficients in the convolution kernel are masked by a portion of the mask corresponding to the pixel. In one embodiment, the partial convolution layer is configured to utilize a stride greater than one to reduce a resolution of the feature map compared to a resolution of an input to the partial convolution layer.

In one embodiment, the neural network is trained, based on a total loss function comprising a weighted sum of loss components, to adjust the attributes of the neural network. The loss components that contribute to the total loss function can include at least one of a style loss component, a perceptual loss component, and a total variation component.

In one embodiment, a system for carrying out an image in-painting task is disclosed. The system includes a memory and at least one parallel processing unit coupled to the memory and configured to implement, at least in part, a neural network. The memory stores an image and a mask that identifies one or more holes in the image. The neural network is configured to process the image and the mask to generate a predicted image. At least one layer of the neural network is configured to perform a partial convolution operation on the image based on the mask. In one embodiment, the at least one layer is further configured to update the mask subsequent to the partial convolution operation. Updating the mask can include performing a convolution operation on the mask and normalizing a result of the convolution operation.

In one embodiment, the neural network is trained via a first parallel processing unit and a second parallel processing unit. Each of the first parallel processing unit and the second parallel processing unit are assigned different batches of training samples from a training data set.

In one embodiment, a non-transitory computer-readable media is disclosed for storing computer instructions for performing image in-painting. The instructions, when executed by one or more processors, cause the one or more processors to perform the steps of processing an input that includes an image and a mask that identifies one or more holes in the image by one or more layers of a neural network to generate a predicted image. At least one layer of the neural network is configured to perform a partial convolution operation on the image based on the mask. In one embodiment, the at least one layer is further configured to update the mask subsequent to performing the partial convolution operation.

DETAILED DESCRIPTION

The following Figures describe an approach for performing image in-painting by configuring a deep learning neural network to perform partial convolution operations on an image based on a mask that identifies holes (e.g., invalid pixel data) in the image. The mask is updated after each partial convolution operation thereby shrinking the holes. Furthermore, by including multiple partial convolution layers in an encoder-decoder framework, any arbitrary, irregularly-sized holes can be forced to disappear completely within the encoder section of the neural network. The partial convolution operations mask out invalid pixel data in the holes such that the invalid pixel data does not propagate to the synthesized pixels of the predicted image.

Figure 1:
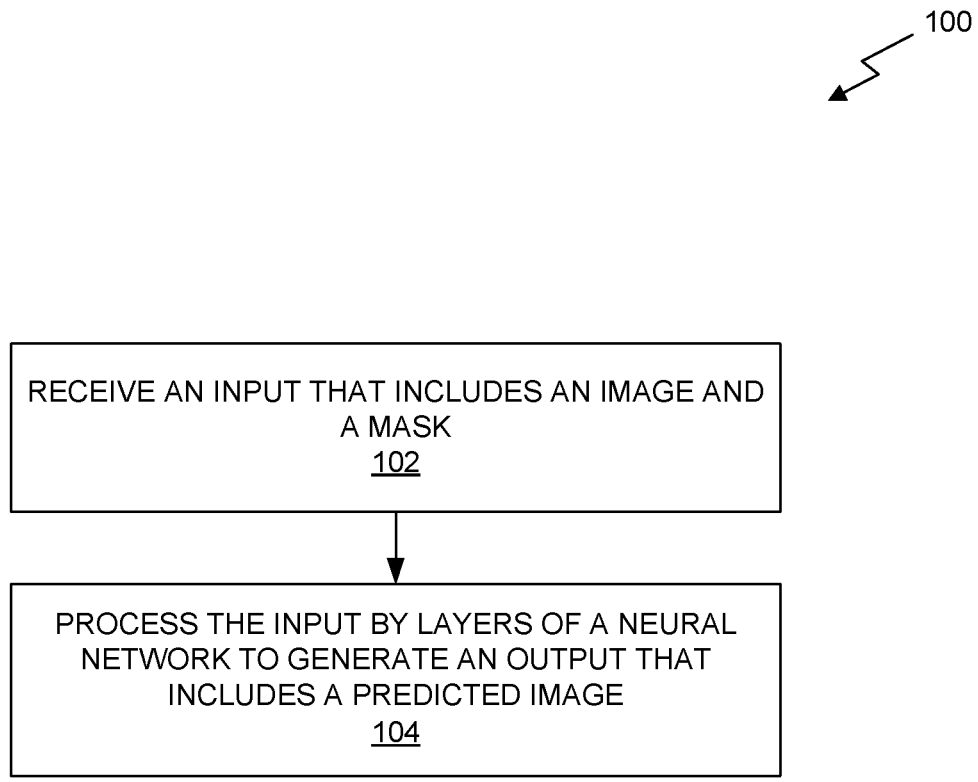
FIG. 1 illustrates a flowchart of a method for synthesizing pixel data for an image in-painting task, in accordance with an embodiment.

FIG. 1 illustrates a flowchart of a method 100 for synthesizing pixel data for an image in-painting task, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processor capable of implementing a deep learning neural network, as described in more detail below. Furthermore, persons of ordinary skill in the art will understand that any system that performs method 100 is within the scope and spirit of embodiments of the present disclosure.

At step 102, an input is received that includes an image and a mask. In one embodiment, the image, stored in a memory, is processed by an algorithm to automatically generate the mask for the image. For example, a filter can be applied to the image to identify pixels of a particular color as invalid pixel data, thereby generating a binary mask that indicates which pixels of the image are invalid and which pixels of the image are valid. In another example, a software tool can be used to manually identify invalid pixel data in the image using, e.g., a paintbrush tool or an eraser tool.

At step 104, the input is processed by layers of a neural network to generate an output that includes a predicted image. In one embodiment, the predicted image includes synthesized pixel data to fill the holes of the image in the input. At least one layer of the neural network is configured to perform a partial convolution operation on the image based on the mask. In addition, the mask can be updated after each layer of the neural network that performs a partial convolution operation.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
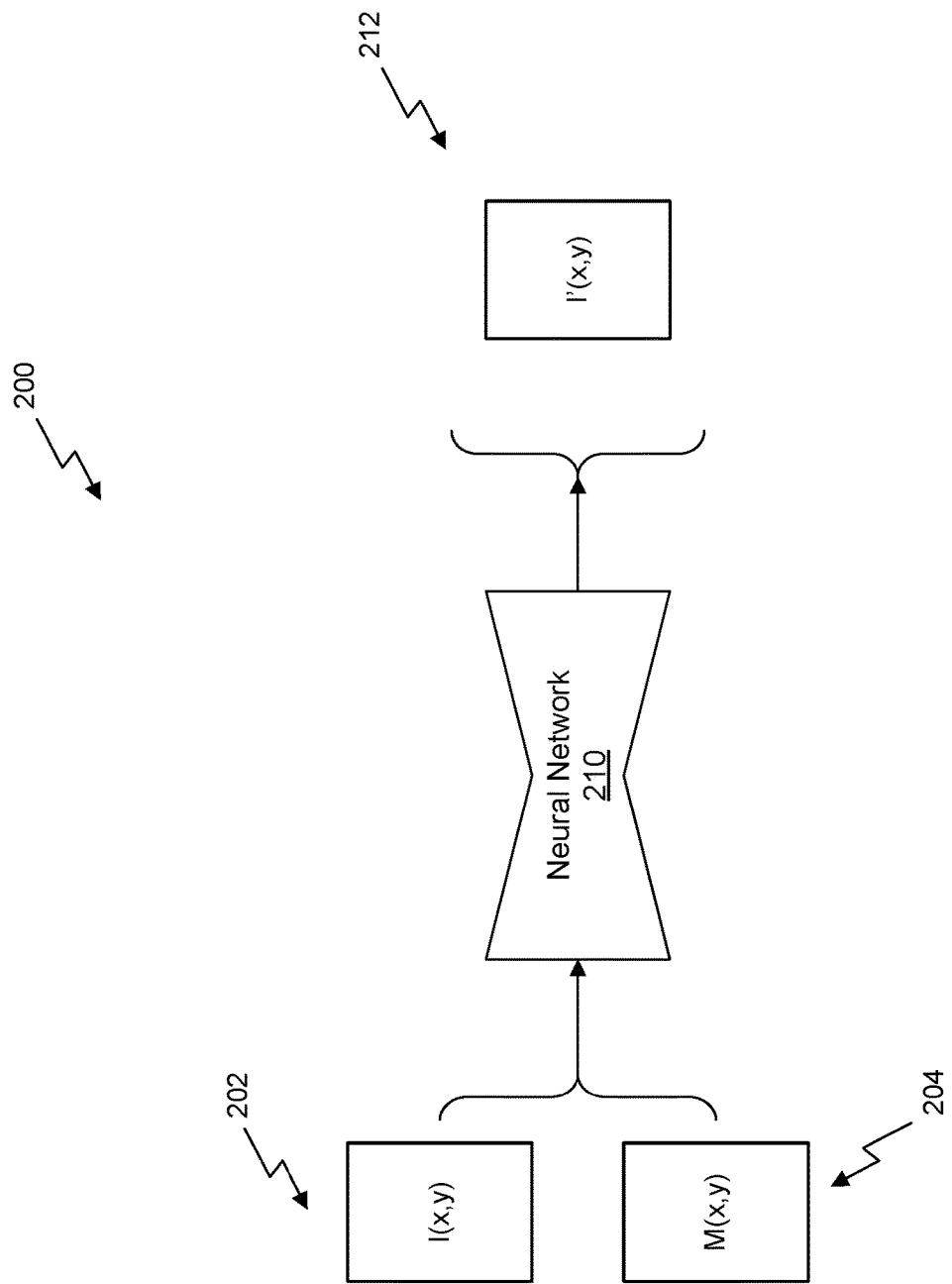
FIG. 2 illustrates an image in-painting system, in accordance with some embodiments.

FIG. 2 illustrates an image in-painting system 200, in accordance with some embodiments. As depicted in FIG. 2, the image in-painting system 200 includes a neural network 210. The neural network 210 can be implemented, at least in part, by a processor such as a CPU or a GPU. For example, each layer of the neural network 210 can be implemented as a software program containing a number of instructions that, when executed by the processor, cause the processor to process the input for the layer. In one embodiment, the neural network 210 receives an input that includes an image 202 and a corresponding mask 204. The image 202 includes invalid pixel data for a number of pixels. Regions of the image 202 comprising adjacent pixels having invalid pixel data can be referred to herein as holes. In one embodiment, the image 202 includes a number of channels, each channel having a two-dimensional array of pixel values. In one embodiment, the image 202 has three channels—a red channel, a green channel, and a blue channel. In another embodiment, the image 202 has a single channel, each pixel containing a value with one or more components (e.g., a 32-bit value for RGBA).

In one embodiment, the mask 204 is a binary mask that, for each pixel of a channel, provides an indication whether that pixel is valid (e.g., a 1) or invalid (e.g., a 0). In one embodiment, the mask 204 has a single channel, where each value in the mask is associated with a corresponding pixel across all channels of the image 202. In other embodiments, the mask 204 is multi-channel, where each channel of the mask 204 corresponds to a particular channel of the image 202. For example, the mask 204 can include three channels, each channel including a binary mask for a corresponding channel of the image 202.

In one embodiment, the neural network 210 generates an output that includes an image 212. The image 212 includes synthesized pixel data for at least a portion of the invalid pixels of the image 202. Synthesized pixel data can refer to pixel values that have replaced corresponding pixel values in the image 202 that were identified as invalid by the mask 204.

In one embodiment, the neural network 210 includes a number of layers, each layer configured to process the input to the layer and produce an output that is passed to one or more additional layers of the neural network 210, with the exception of the last layer of the neural network 210 that generates the output for the neural network 210. In one embodiment, at least one layer of the neural network 210 is a partial convolution layer that applies a partial convolution operation to the input for the layer based, at least in part, on the mask 204 or updated versions of the mask 204.

As used herein, a partial convolution operation refers to a convolution operation that applies a convolution kernel to a patch of pixels in a channel of the input to the layer, where the coefficients in the convolution kernel are masked based on a corresponding portion of the mask 204. In other words, the coefficients of the convolution kernel are only applied to valid pixel data and zeroed out when the coefficients are applied to invalid pixel data. In one embodiment, the coefficients of the convolution kernel are normalized based on a number of valid pixels included in the patch of pixels.

In one embodiment, the mask 204 is updated after the partial convolution operation. Updating the mask 204 can include switching at least one binary value for a pixel from zero to one to indicate that the convolution kernel for the pixel, as applied to a patch of pixels of the input, overlaps at least one valid pixel in the patch. In other words, the mask 204 is updated to shrink the size of the hole around the edge of the hole based on the size of the convolution kernel.

Although the image in-painting system 200 is described in the context of processing units, the neural network 210 may be implemented as a program, custom circuitry, or by a combination of custom circuitry and a program. For example, the neural network 210 may be implemented by a GPU (graphics processing unit), CPU (central processing unit), or any processor capable of implementing layers of a neural network. Furthermore, persons of ordinary skill in the art will understand that any system that performs the operations of the image in-painting system 200 is within the scope and spirit of embodiments of the present disclosure. One such example of a parallel processing unit for implementing one or more of the units included in the image in-painting system 200 is described in more detail below.

Parallel Processing Architecture

Figure 3:
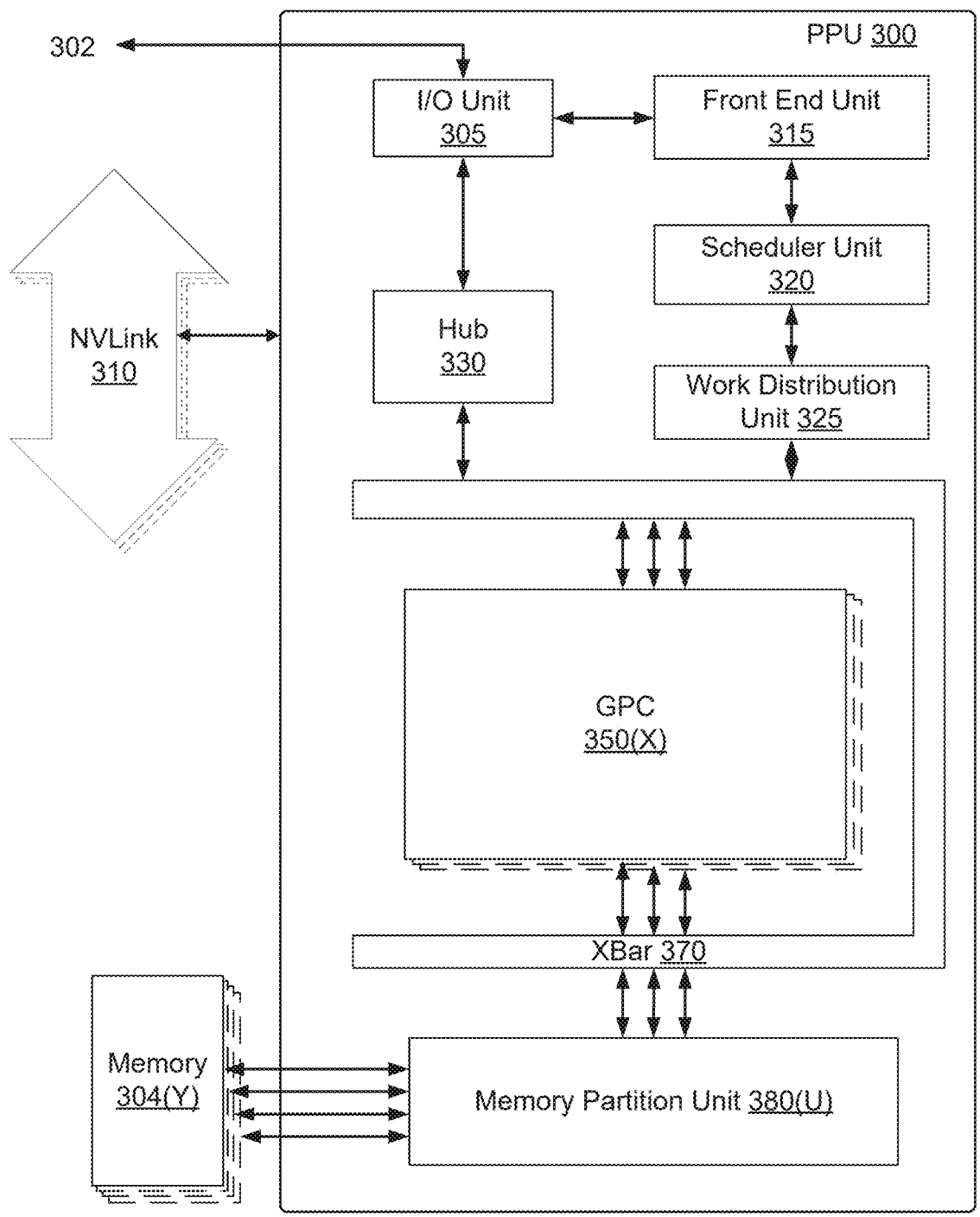
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
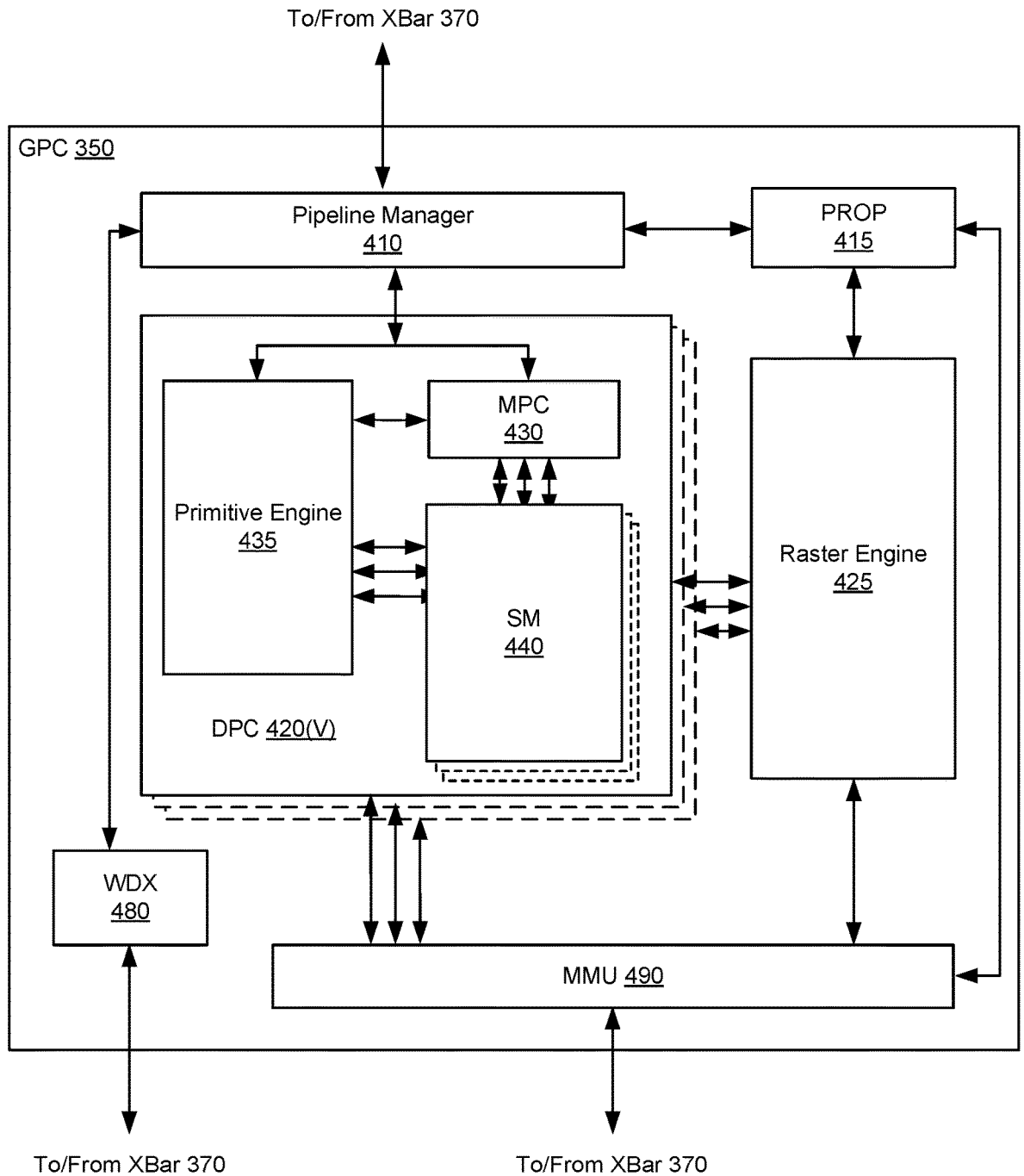
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
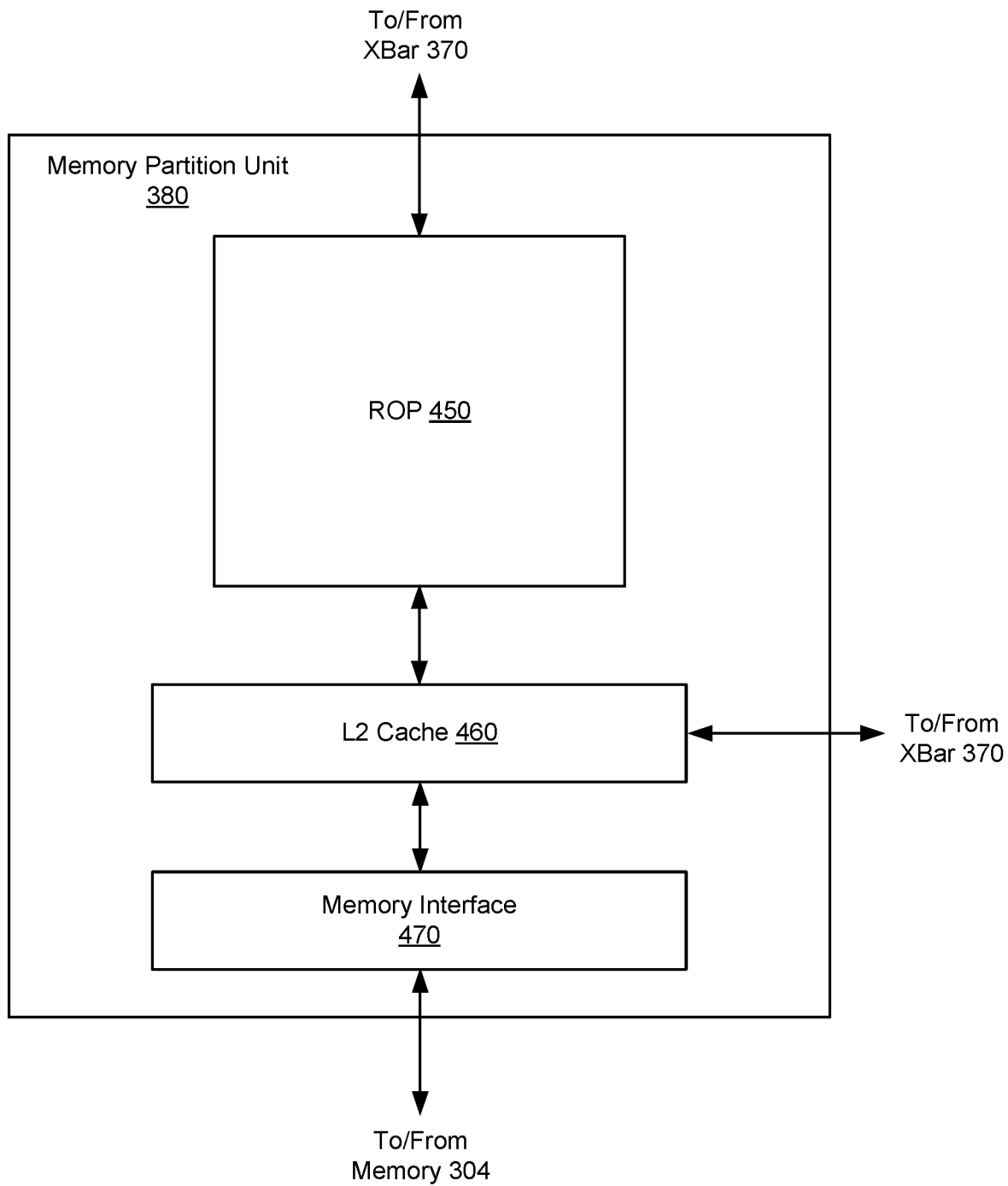
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
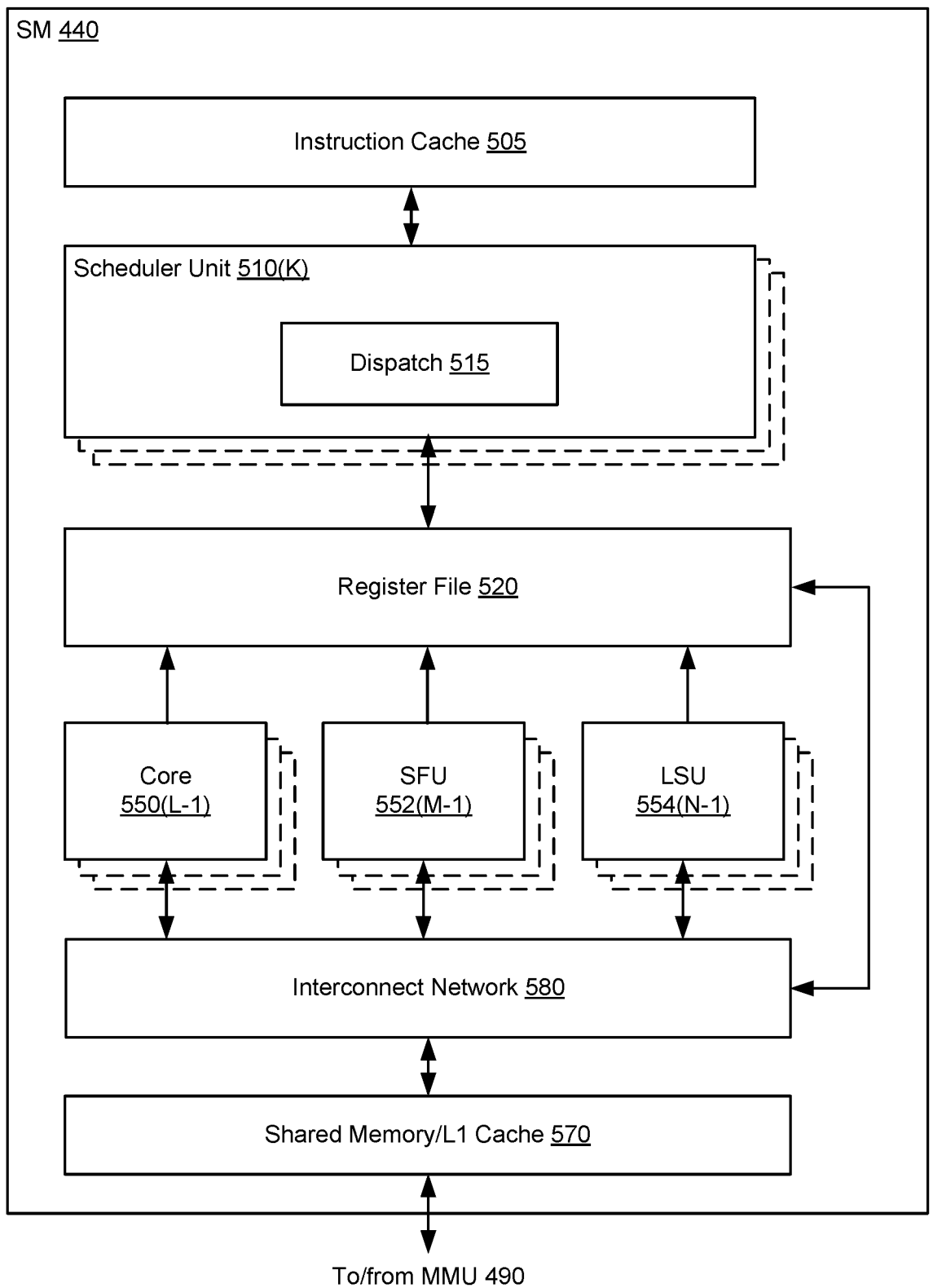
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
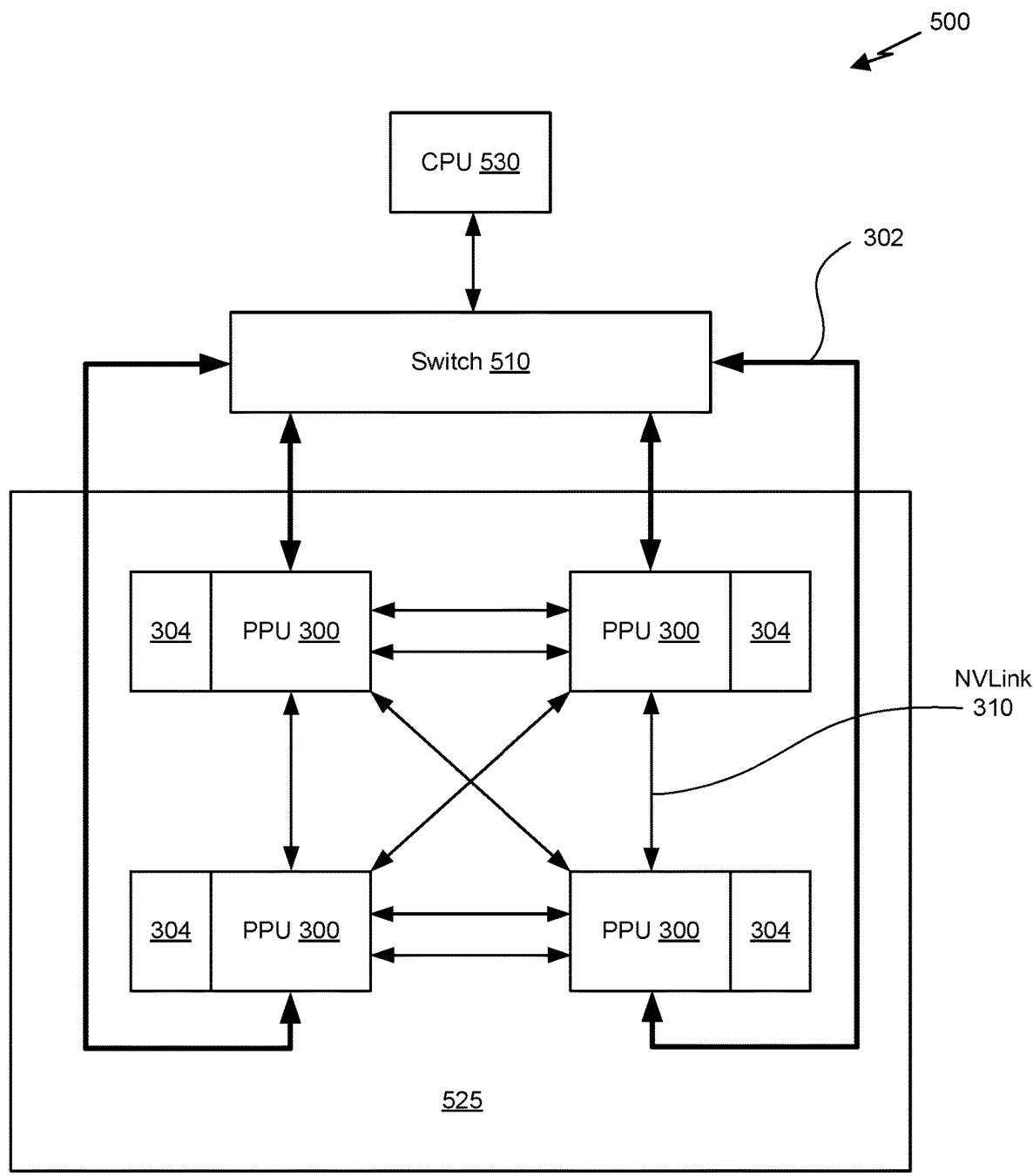
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1. The processing system 500 includes a CPU 530, switch 510, and multiple PPUs 300 each coupled to respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
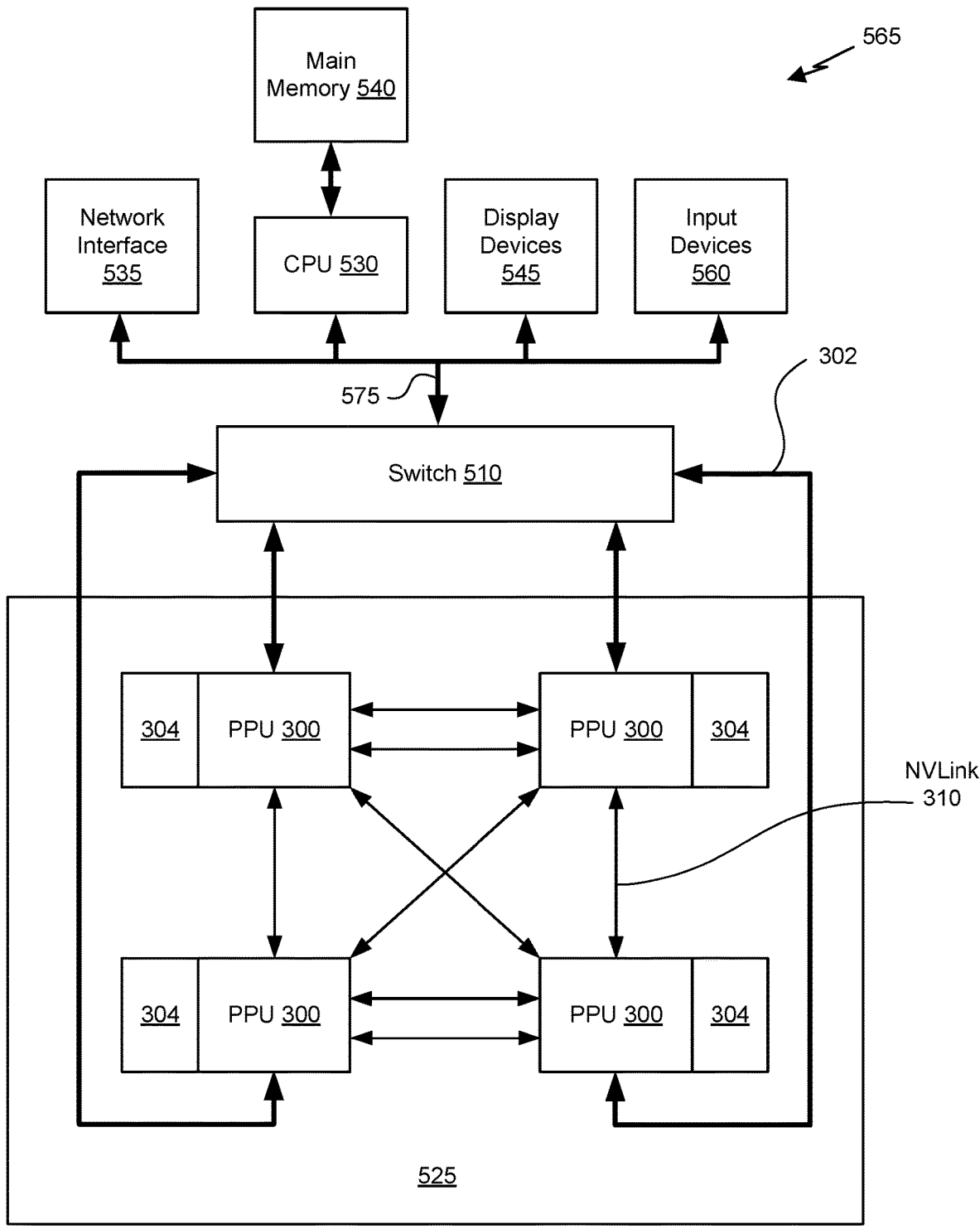
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

Image in-Painting Utilizing Partial Convolutions

Figure 6A:
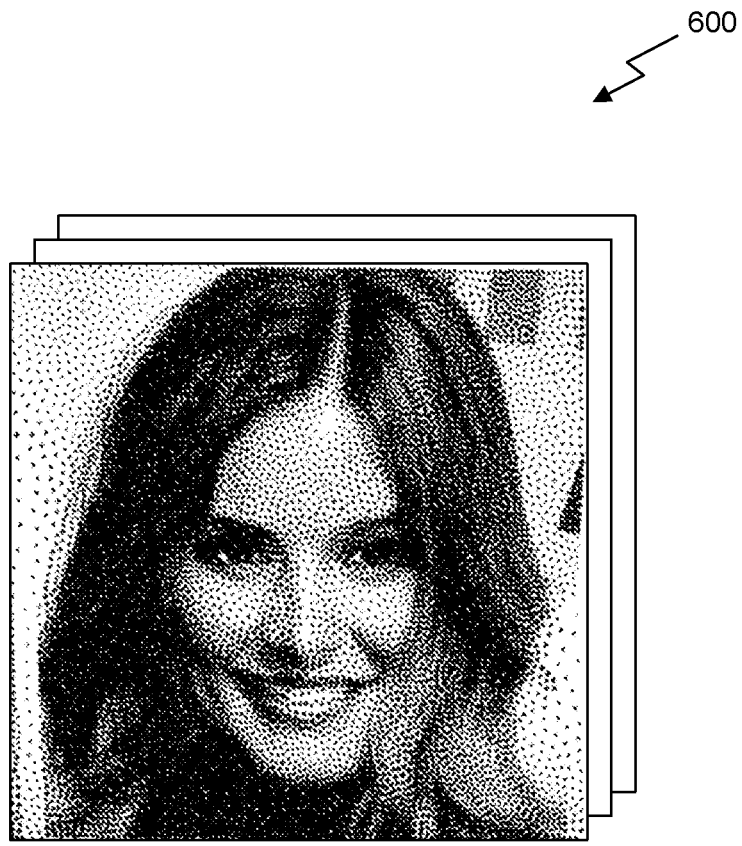
FIG. 6A illustrates an image, in accordance with some embodiments.

FIG. 6A illustrates an image 600, in accordance with some embodiments. The image 600 is a two-dimensional array of pixel values having a width and height. In one embodiment, the image 600 is a color image that includes a number of color channels, such as a red channel, a green channel and a blue channel.

Figure 6B:
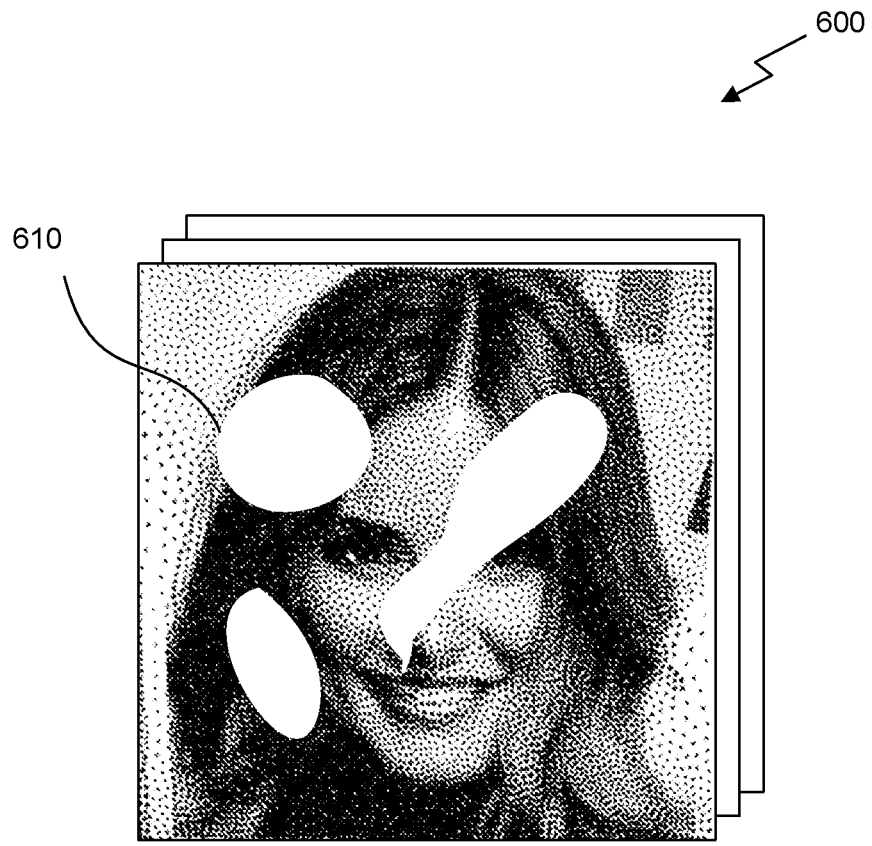
FIG. 6B illustrates the image having a number of irregular holes, in accordance with some embodiments.

FIG. 6B illustrates the image 600 having a number of irregular holes 610, in accordance with some embodiments. In one embodiment, the holes 610 can be added to the image 600 using a software tool, such as an erasure tool or paintbrush tool to delete pixel data or change pixel data to a common color, such as a background color, respectively. A filter can be used to identify the holes 610 by examining the color values for the pixels and comparing the color values to the background color or the common color. In another embodiment, the holes 610 can be added to the image 600 by applying a mask or hole pattern to the image 600 to add a hole having a shape defined by the mask or hole pattern. In other embodiments, the holes 610 can be added by any technically feasible means including random or pseudo-random algorithms.

The pixels of the image 600 identified as being included in a hole 610 represent invalid pixel data. As depicted in FIG. 6B, the image 600 includes a number of holes 610. Each hole 610 refers to a contiguous portion of invalid pixel data in the image 600. A hole 610 can be as small as one pixel. However, most holes 610 include two or more pixels. A pixel is contiguous to another pixel when the other pixel is offset from the pixel, in pixel coordinates, by one in either a horizontal direction or a vertical direction. In one embodiment, a pixel is also contiguous with another pixel when the other pixel is offset from the pixel, in pixel coordinates, by one in both the horizontal direction and the vertical direction. In other words, a pixel is contiguous with the other pixel when the pixel is adjacent to the other pixel diagonally.

Figure 6C:
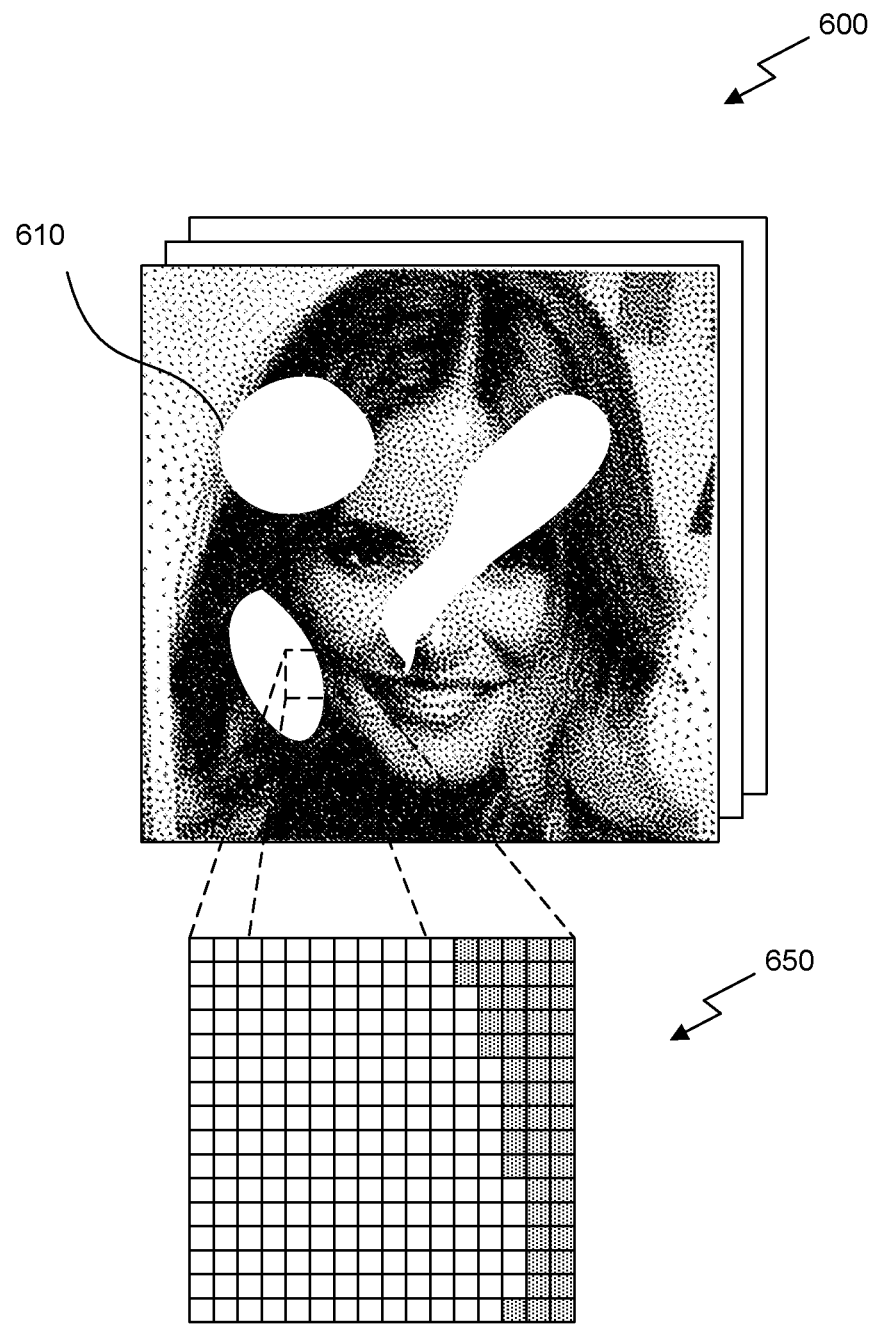
FIG. 6C illustrates a portion of a mask for the image, in accordance with some embodiments.

FIG. 6C illustrates a portion of a mask 650 for the image 600, in accordance with some embodiments. In one embodiment, the mask 650 is a binary mask that identifies which pixels in the image 600 are considered valid and which pixels in the image 600 are considered invalid. In other words, the mask 650 identifies a location of the holes 610 in the image 600.

In one embodiment, the mask 650 is multi-channel and includes one channel for each channel of the image 600. Multiple channels enable the holes 610 to be located at different pixel positions, or have different shapes, across the different channels of the image 600. This enables certain components of a pixel, stored in different channels, to be invalidated independently. In other embodiments, the mask 650 is single channel and identifies the location of holes 610 across all channels. In other words, pixel data for all components of the pixel, across all channels of the image, is invalidated as a whole rather than independently for each channel.

As depicted in FIG. 6C, in one embodiment, the mask 650 includes a binary value (e.g., 0 or 1) for each pixel p(x, y) of the image 600. For pixels of the image 600 that contain valid pixel data, a corresponding pixel in the mask 650 is set to 1, and for pixels of the image 600 that contain invalid pixel data, a corresponding pixel in the mask 650 is set to 0. A 16 pixel by 16 pixel portion of the mask 650 is depicted in FIG. 6C, which shows an edge or boundary between valid pixels of the image 600 and invalid pixels included in a hole 610.

Image in-painting is performed by processing the image 600 using the layers of a neural network 210 and increasing the receptive field for pixels in the holes by stacking a number of partial convolution layers in the neural network 210. In one embodiment, the neural network 210 includes at least eight partial convolution layers that sequentially shrink the holes 610. The features maps produced by the encoder are then expanded, by a decoder, and combined with the spatial information from the intermediate layers of the encoder to generate the synthesized pixel data for the holes.

Figure 7A:
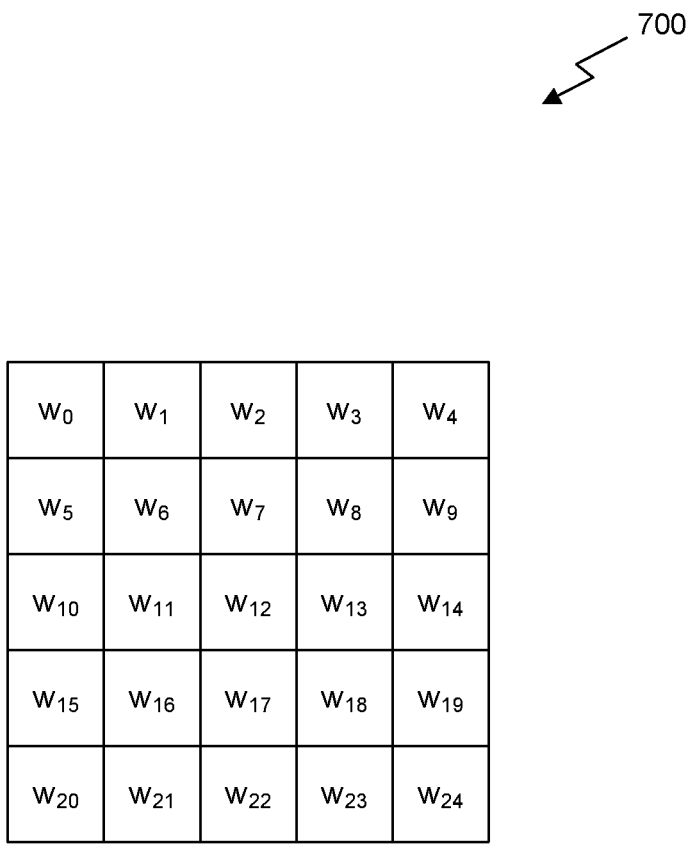
FIG. 7A illustrates a convolution kernel, in accordance with some embodiments.

FIG. 7A illustrates a convolution kernel 700, in accordance with some embodiments. In one embodiment, the convolution kernel 700 is a two-dimensional array of coefficients (e.g., weights for the convolution operation). The coefficient values are set during training of the neural network 210. As depicted in FIG. 7A, the convolution kernel 700 is a 5×5 convolution kernel that includes 25 coefficients that, when applied to a patch of pixels of the image 600, produce a result for a corresponding pixel of a feature map.

A feature map refers to a representation of features of the image that is generated as the result of a convolution operation. It will be appreciated that the convolution kernels applied by each layer of the neural network 210 are not limited to a particular size and can be larger or smaller than the convolution kernel 700.

A conventional convolution operation multiplies each of the coefficients by a corresponding pixel value in a window of pixels being convolved with the convolution kernel. The partial products associated with each multiplication are then summed to generate a predicted value for a corresponding pixel of a predicted image. In conventional image in-painting techniques that utilize a convolution operation, pixel values for invalid pixels are first initialized with a particular color, such as a mean color of the image or a sampled color from a portion of the image. However, by introducing this new substitute pixel color to the convolution operation, often copied over many of the pixel positions within the window, the substitute pixel color can dominate the resulting pixels of the filled holes. Such results are typically easily recognizable as constituting synthesized images. These poor results are then processed using expensive post-processing techniques to attempt to mitigate the artifacts produced by the convolution operation. However, utilizing partial convolution operations instead of conventional convolution operations can remove the contribution from the substitute pixel colors from the result. Partial convolution operations produce better results that are less likely to be recognized as synthesized images.

Figure 7B:
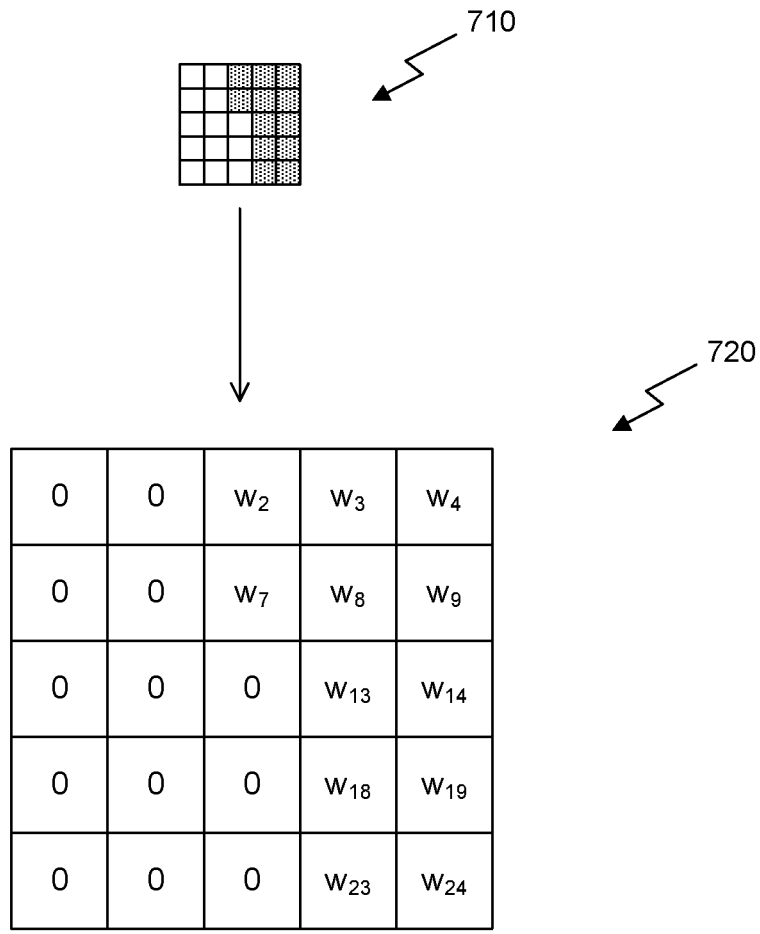
FIG. 7B illustrates a partial convolution operation based on the convolution kernel of FIG. 7A, in accordance with some embodiments.

FIG. 7B illustrates a partial convolution operation based on the convolution kernel 700 of FIG. 7A, in accordance with some embodiments. The partial convolution operation involves zeroing out many of the coefficients of the convolution kernel 700 that overlap invalid pixels in the image 600. As depicted in FIG. 7B, a patch 710 of the mask 650 corresponding to the image 600 indicates which pixels are valid in a corresponding patch of the image 600 being convolved with the convolution kernel 700. The hatched pixels in the patch 710 indicate valid pixels—e.g., pixels having values of '1' in the mask 650. The patch 710 of the mask 650 is multiplied by the convolution kernel 700 to generate the partial convolution kernel 720.

In general, the partial convolution operation can be given by:

$$x'_{(i,j)} = W^T (X_{(i,j)} \odot M_{(i,j)}) \frac{\|1_{(i,j)}\|}{\text{sum}(M_{(i,j)})} + b, \qquad \text{(Eq. 1)}$$

where $\odot$ denotes element-wise multiplication, $X_{(i,j)}$ is the patch of pixels in the image X associated with pixel $p(i,j)$, $M_{(i,j)}$ is the corresponding patch of the mask M associated with the image X, $W^T$ is the transposed matrix of coefficients for the partial convolution kernel, and b is a bias value. The term $\|1_{(i,j)}\|$ is the l-norm of a 1 matrix (a matrix where every element has a value equal to 1) having equal size to $M_{(i,j)}$, and the l-norm of the 1 matrix is equivalent to the total number of binary values in M or, alternatively, the number of coefficients in $W^T$. This holds for all pixel vales where sum(M) is greater than zero (i.e., there is at least one valid pixel that overlaps the window corresponding to the partial convolution operation). Otherwise, where sum(M) is equal to zero, the resulting pixel value of the partial convolution operation is 0.

In one embodiment, the partial convolution kernel 720 is normalized by a scaling factor. As shown in Equation 1, the scaling factor can be given as the l-norm of the 1 matrix divided by the sum of the elements of $M_{(i,j)}$, which is simply the total number of binary values in $M_{(i,j)}$ divided by the total number of binary values in $M_{(i,j)}$ set to 1.

In one embodiment, the mask is updated after the partial convolution operation, where each pixel of the mask is set to one if the denominator of the scaling factor, sum(M), for that pixel is greater than zero. Otherwise, the pixel is set to zero, as given by:

$$M' = \begin{cases} 1 & \text{if sum}(M) > 0 \\ 0 & \text{otherwise} \end{cases} \qquad \text{(Eq. 2)}$$

It will be appreciated that the mask update operation in Equation 2 can be implemented by applying a convolution operation to the mask utilizing a convolution kernel where all coefficients are set to one, followed by an activation function that sets all non-zero values to one.

Figure 8:
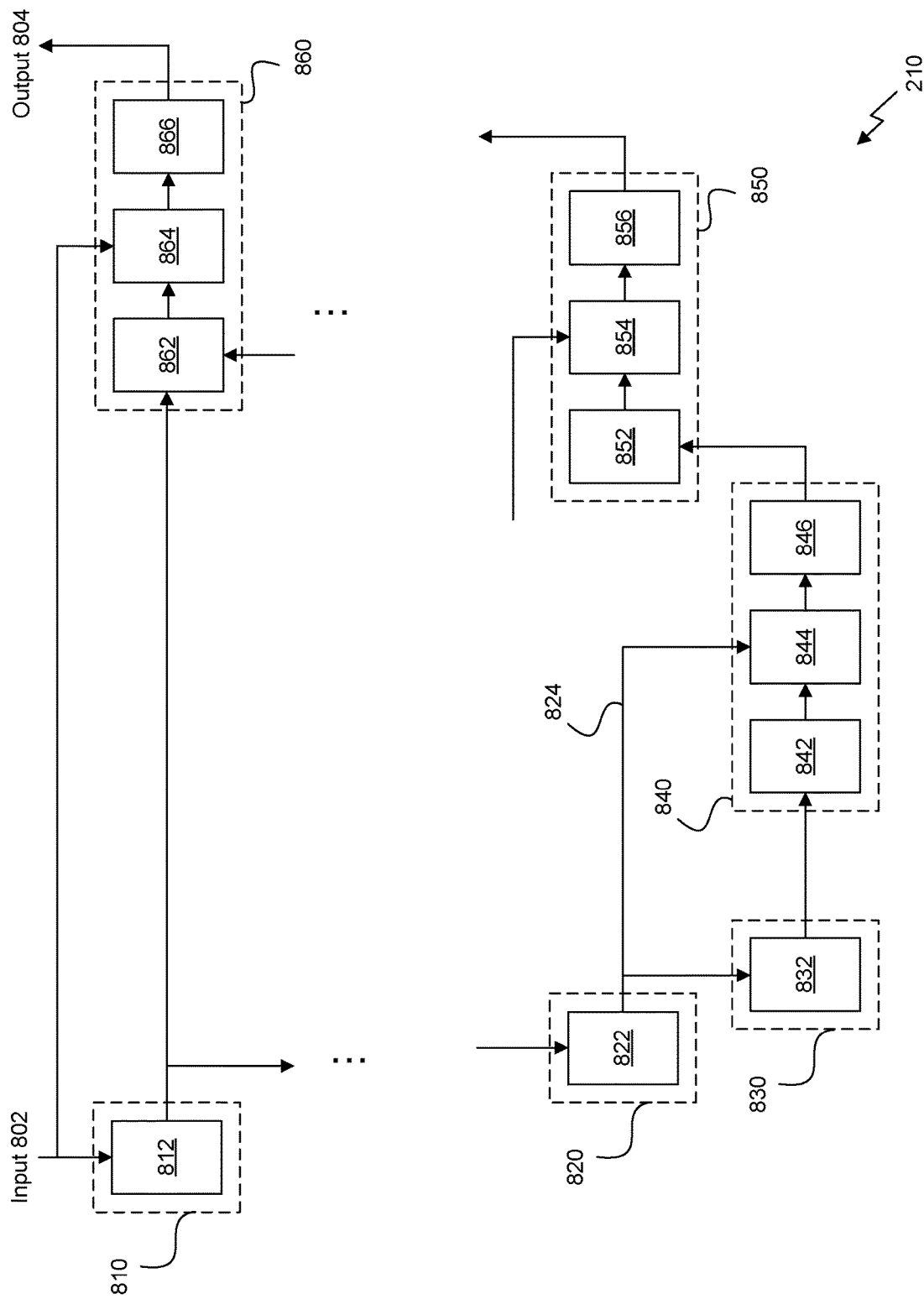
FIG. 8 illustrates a deep learning neural network architecture of the neural network of FIG. 2, in accordance with some embodiments.

FIG. 8 illustrates a deep learning neural network architecture of the neural network 210 of FIG. 2, in accordance with some embodiments. The neural network 210 is a modified type of convolutional neural network (CNN), which can be referred to generally as a U-Net or a V-Net because of the structure and connections between each stage of the network. Like a conventional CNN, the neural network 210 includes an encoder that applies a number of partial convolution operations to an input 802 to extract feature information. The neural network 210 also includes a decoder that expands the feature information in pixel space and combines the feature information with spatial information forwarded from the stages of the encoder to generate the output 804.

In one embodiment, as depicted in FIG. 8, the neural network 210 includes a first stage 810 that receives the input 802, which includes an image, I, and a mask, M. In one embodiment, the input 802 comprises three channels per image: (1) a red channel; (2) a green channel; and (3) a blue channel. The input 802 is provided in 3 dimensions: x-coordinate and y-coordinate in pixel space and a c-coordinate for the channels. Each channel comprises a portion of the image and a corresponding portion of the mask. For example, the red channel includes a two-dimensional array (H×W) of pixels, where each pixel includes a value for the red component of the pixel color for the image. The red channel also includes a second two-dimensional array (H×W) of pixels concatenated to the first two-dimensional array of pixels, where each pixel in the second two-dimensional array of pixels includes a binary value identifying whether that pixel is valid or invalid.

The encoder section of the neural network 210 includes a number of partial convolution layers. Each partial convolution layer is configured to perform a partial convolution operation based on the convolution kernel for the layer. The coefficients of the convolution kernel are masked and normalized using the values for the mask included in the input 802. It will be appreciated that the coefficients in the convolution kernel are predicted during the training of the neural network 210, as will be described in more detail below.

Each partial convolution layer also includes a mask update step that is performed after the partial convolution operation. The mask update step updates the mask values for the pixels of the feature map generated by the partial convolution operation. More specifically, if any portion of the convolution kernel applied for a particular pixel of the feature map overlaps a valid pixel in the patch of pixels of the image, then a corresponding pixel of the updated mask is valid.

In one embodiment, the first stage 810 includes a partial convolution layer 812 that applies a partial convolution operation to the input 802. The result of the partial convolution operation is a number of feature maps that includes activations associated with the input 802. In one embodiment, the partial convolution operation utilizes a stride of 2 in both the horizontal and the vertical dimensions, in pixel space. In other words, the result of the partial convolution operation is a feature map having half of the resolution, in each dimension of the pixel space, compared to a resolution of the input 802.

In one embodiment, the partial convolution layer 812 only applies the partial convolution operation to the first portion of the input 802 (e.g., the portion of the input 802 containing pixel data for the image). The partial convolution layer 812 applies a second convolution operation to the second portion of the input 802 (e.g., the portion of the input 802 containing the mask). The second convolution operation can apply a convolution kernel of the same size as the partial convolution operation, where all coefficients are equal to one, to the second portion of the input 802 to generate an updated mask. The activations of the second convolution operation are normalized such that any non-zero valued activation is set to one and the zero valued activations are set equal to zero. In one embodiment, the second convolution operation utilizes a stride of 2 such that the mask portion of the resulting feature map has the same resolution as the image portion of the resulting feature map.

In some embodiments, the partial convolution layer 812 is followed by an activation function, not explicitly shown, such as a rectified linear unit (ReLU). It will be appreciated that, in some embodiments, the activation function can be moved in front of each partial convolution operation.

In some embodiments, the partial convolution layer 812 can be followed by a batch normalization operation, prior to the activation function. Batch normalization can aid in speeding up the training of the neural network 210.

In some embodiments, the first stage 810 can separate the partial convolution operation and the down-sampling operation. For example, the partial convolution operation can be applied utilizing a stride of 1, which maintains the same resolution of the feature maps, in pixel space, as the input to the partial convolution operation. The feature map output by the partial convolution layer can then be processed by a separate and distinct down-sampling layer that is configured to reduce the resolution of the feature map. In conventional CNNs this function can be performed by a pooling layer. However, in some embodiments, the down-sampling layer is simply implemented as a separate convolution layer that utilizes a stride of 2. It will be appreciated that by separating the partial convolution operation from the down-sampling operation, the predicted coefficients used in the filtering for the down-sampling can be different than the predicted coefficients used in the partial convolution operation for performing the image in-painting operation to at least partially fill the holes in the image.

The feature maps from the first stage 810 are passed to a second stage of the encoder section, not explicitly shown. The second stage is similar to the first stage except the input to the second stage is the output from the first stage 810, which is reduced in resolution, in each dimension of the pixel space, compared to the input 802 and can include a much larger number of channels than the input 802. For example, the input 802 to the first stage 810 can include three channels while the input to the second stage can include, e.g., 64 channels.

The encoder section of the neural network 210 includes a number of stages. Each stage can implement a partial convolution operation for convolution kernels of various sizes. In addition, each stage can reduce the resolution of the feature maps, in each dimension of the pixel space, by implementing a stride greater than 1. It will be appreciated that, in some embodiments, one or more stages of the encoder section of the neural network 210 can maintain the same resolution in the output feature maps as the input feature maps.

In one embodiment, the encoder section of the neural network 210 includes at least eight stages. For example, the first stage 810 receives an input 802 having three channels, as described above. The partial convolution layer 812 of the first stage 810 generates a feature map comprising 64 channels, where the resolution of the feature map generated by the partial convolution layer 812 are halved in each dimension of the pixel space (e.g., 540×960 resolution). The second stage doubles the number of channels of the feature maps (e.g., 64 to 128) and halves the resolution in each dimension of the pixel space (e.g., 270×480). The third stage doubles the number of channels of the feature maps (e.g., 128 to 256) and halves the resolution in each dimension of the pixel space (e.g., 135×240). The fourth stage doubles the number of channels of the feature maps (e.g., 256 to 512) and halves the resolution in each dimension of the pixel space (e.g., 68×120). The fifth stage maintains the number of channels of the feature maps (e.g., 512) and halves the resolution in each dimension of the pixel space (e.g., 34×60). The sixth stage maintains the number of channels of the feature maps (e.g., 512) and halves the resolution in each dimension of the pixel space (e.g., 17×30). The seventh, and penultimate, stage 820 maintains the number of channels of the feature maps (e.g., 512) and halves the resolution in each dimension of the pixel space (e.g., 9×15). Finally, the eighth stage 830 maintains the number of channels of the feature maps (e.g., 512) and halves the resolution in each dimension of the pixel space (e.g., 5×8).

It will be appreciated that the partial convolution operations may require padding to compensate for missing information in the input. For example, padding may be required when a stride of 2 is used but the height or width of the input is odd. In some embodiments, existing padding schemes, such as zero padding, reflection, and repetition padding can be used. However, in other embodiments, a new padding scheme for partial convolution operations can be implemented where the padded values are treated as invalid pixels in hole regions. Rather than simply using zero padding without normalizing the resulting values, the partial convolution padding scheme normalizes the resulting values of the partial convolution operation based on a scaling factor, as discussed in more detail above. The scaling factor normalizes the results based on the number of valid pixels in the partial convolution operation for each patch of pixels convolved with a convolution kernel.

It will be appreciated that each partial convolution layer in the encoder section of the neural network 210 can implement a convolution operation using a convolution kernel of a different size. For example, in one embodiment, the partial convolution layer 812 of the first stage 810 implements a partial convolution operation based on a 7×7 convolution kernel; the partial convolution layers of the second stage and the third stage implement partial convolution operations based on a 5×5 convolution kernel; and the partial convolution layers of the other stages of the encoder implement partial convolution operations based on 3×3 convolution kernels. However, in other embodiments, different sized convolution kernels can be implemented at each stage of the encoder section of the neural network 210.

The encoder section of the neural network 210 extracts the feature information from the spatial resolution of the input image and encodes that information at low spatial resolution over a large number of channels. In one embodiment, the output of the encoder section is processed by a decoder section of the neural network 210. Each stage of the decoder section includes an up-sampling layer, a concatenation layer, and a partial convolution layer. The up-sampling layer receives the input from a previous stage of the neural network 210 and increases the resolution, in the pixel space, of each channel of the input. The concatenation layer combines the up-sampled input with the input of a corresponding stage of the encoder section. The partial convolution layer then performs a partial convolution operation of the output of the concatenation layer.

In one embodiment, as depicted in FIG. 8, the first stage 840 of the decoder section includes an up-sampling layer 842, a concatenation layer 844, and a partial convolution layer 846. Because there is no previous stage of the decoder section at the first stage 840, the input of the up-sampling layer 842 merely comprises the feature maps generated by the last stage 830 of the encoder section of the neural network 210.

In one embodiment, the up-sampling layer 842 implements an up-sampling operation using nearest neighbor interpolation to up-sample each channel of the input by a factor of 2, in each dimension of the pixel space. As depicted in FIG. 8, the up-sampling layer 842 of the first stage 840 of the decoder section up-samples the output of the partial convolution layer 832 of the last stage 830 of the encoder section of the neural network 210. Nearest neighbor interpolation simply fills the missing pixel values in the up-sampled feature map with a copy of the nearest neighbor to that pixel value. In other words, each row and column of the input feature map is copied into the next row or column. This is the simplest up-sampling technique and can be switched with other more complex interpolation techniques. For example, in another embodiment, the up-sampling operation utilizes bilinear interpolation to up-sample each channel of the input. In some embodiments, the scaling factor can be greater than 2 (e.g., 4) to implement a more aggressive increase in spatial resolution at each layer of the decoder section.

Following the up-sampling layer 842, a concatenation layer 844 augments the up-sampled feature maps with feature maps input to a corresponding stage of the encoder section of the neural network 210. In one embodiment, the feature maps from the skip links are simply concatenated with the up-sampled feature maps to increase the number of channels of the input to the partial convolution layer 846. For example, as shown in FIG. 8, the feature maps input to the partial convolution layer 832 of the final stage 830 of the encoder section are forwarded to the up-sampling layer 844 via skip link 824. It will be appreciated that the input to a particular stage of the encoder section can also be referred to as an output of a previous stage of the encoder section. The skip link 824 provides spatial information from an intermediate layer of the encoder to the decoder to augment the up-sampled feature information at each stage of the decoder.

Finally, a partial convolution layer 846 performs a partial convolution operation to combine and filter the information from the feature maps output by the concatenation layer 844. In one embodiment, the partial convolution operations are three-dimensional (3D) convolution operations that apply convolution kernels to two or more channels of the input to generate an output of the partial convolution layer 846. For example, in a simple case, a partial convolution operation could apply a first convolution kernel to a channel output by the up-sampling layer 842 and apply a second convolution kernel to a channel received via the skip link, combining the resulting values of the partial convolution operation into a single channel of the output feature map. In one embodiment, the output of the concatenation layer 844 is 1024 channels and the output of the partial convolution layer 846 is 512 channels.

The output of the partial convolution layer 846 is transmitted to the next stage of the decoder section of the neural network 210. Each stage of the decoder section receives the output of the previous stage of the decoder section. For example, the second stage 850 of the decoder section receives the output of the partial convolution layer 846 of the first stage 840 of the decoder section. The up-sampling layer 852 processes the output of the partial convolution layer 846 to double the resolution, in each dimension of the pixel space, of the feature map. The output of the up-sampling layer 852 is passed to the concatenation layer 854, which combines the feature map with the feature map input to the partial convolution layer 822. Finally, the partial convolution layer 856 applies a partial convolution operation to the output of the concatenation layer to generate a feature map for the next stage of the decoder section. This process is repeated for a number of stages of the decoder section of the neural network 210.

It will be appreciated that the number of channels in the feature map from the previous stage in the decoder section does not have to match the number of channels in the feature map from the corresponding stage of the encoder section forwarded via the skip link. For example, a fifth stage of the decoder section can concatenate a 512 channel output of the up-sampling layer with a 256 channel input from the skip link; a sixth stage of the decoder section can concatenate a 256 channel output of the up-sampling layer with a 128 channel input from the skip link; a seventh stage of the decoder section can concatenate a 128 channel output of the up-sampling layer with a 64 channel input from the skip link; and an eighth stage 860 of the decoder section can concatenate a 64 channel output of the up-sampling layer with a 3 channel input (e.g., input 802) from the skip link.

In one embodiment, the neural network 210 includes eight stages in the decoder section, doubling the spatial resolution of the feature map, in each dimension of the pixel space, at each stage in the decoder section. For example, the first stage 840 of the decoder section increases the spatial resolution from 5×8 to 9×15; the second stage of the decoder section increases the spatial resolution from 9×15 to 17×30; the third stage of the decoder section increases the spatial resolution from 17×30 to 34×60; the fourth stage of the decoder section increases the spatial resolution from 34×60 to 68×120; the fifth stage of the decoder section increases the spatial resolution from 68×124 to 135×240; the sixth stage of the decoder section increases the spatial resolution from 135× 240 to 270×480; the seventh stage of the decoder section increases the spatial resolution from 270×480 to 540×960; and the eighth stage of the decoder section increases the spatial resolution from 540×960 to the full high-definition resolution of 1080×1920.

In some embodiments, each partial convolution layer in the decoder section of the neural network 210 applies a partial convolution operation based on 3×3 convolution kernels and utilizing a stride of 1 (e.g., the resolution of the output feature maps matches a resolution of the input feature maps).

In some embodiments, the number of stages in both the encoder and decoder sections of the neural network 210 can be different to accommodate different input or output resolutions. For example, additional stages can be added to the architecture of the neural network 210 to process higher resolution images in the input and generate higher resolution images in the output (e.g., UHD resolution of 3840×2160). Alternatively, stages can be omitted to either increase the resolution of the feature maps passed from the last stage of the encoder section to the first stage of the decoder section of the neural network 210 or for processing input images of decreased initial resolution (e.g., 512×512 input images).

The operation of the up-sampling layer 862, the concatenation layer 864, and the partial convolution layer 866 of stage 860, respectively, operate similarly to the like layers of the first stage 840 of the decoder section with the exception that the skip link coupled to the concatenation layer provides the original input 802 to the partial convolution layer 866 in addition to the up-sampled output of the up-sampling layer 862.

In one embodiment, each partial convolution layer of the decoder section is followed by an activation function. In some embodiments, the activation function is a Leaky ReLU with parameter alpha (slope) set to 0.2. In one embodiment, no activation function is applied to the output of the partial convolution layer 866 of the last stage of the decoder section of the neural network 210.

In one embodiment, the output 804 of the neural network 210 is an image that includes synthesized pixel data that fills the irregular holes in the image of the input 802. It will be appreciated that the image in the output 804 may have different pixel values for even valid pixels of the image in the input 802. Therefore, in some embodiments, a post-processing step combines the valid pixel data from the image in the input 802 with the synthesized pixel data from the image in the output 804 that fills the holes.

It will be appreciated that the exact structure, such as the size of the convolution kernels, the stride parameters, the number of stages in each of the encoder and decoder sections, and the like are provided for illustration of one exemplary embodiment of the neural network 210. In other embodiments, the neural network 210 can depart from the exemplary structure described above, such as by implementing a different number of stages, making the down-sampling and up-sampling more aggressive, increasing or decreasing the size of the convolution kernels, and so forth.

Figure 9:
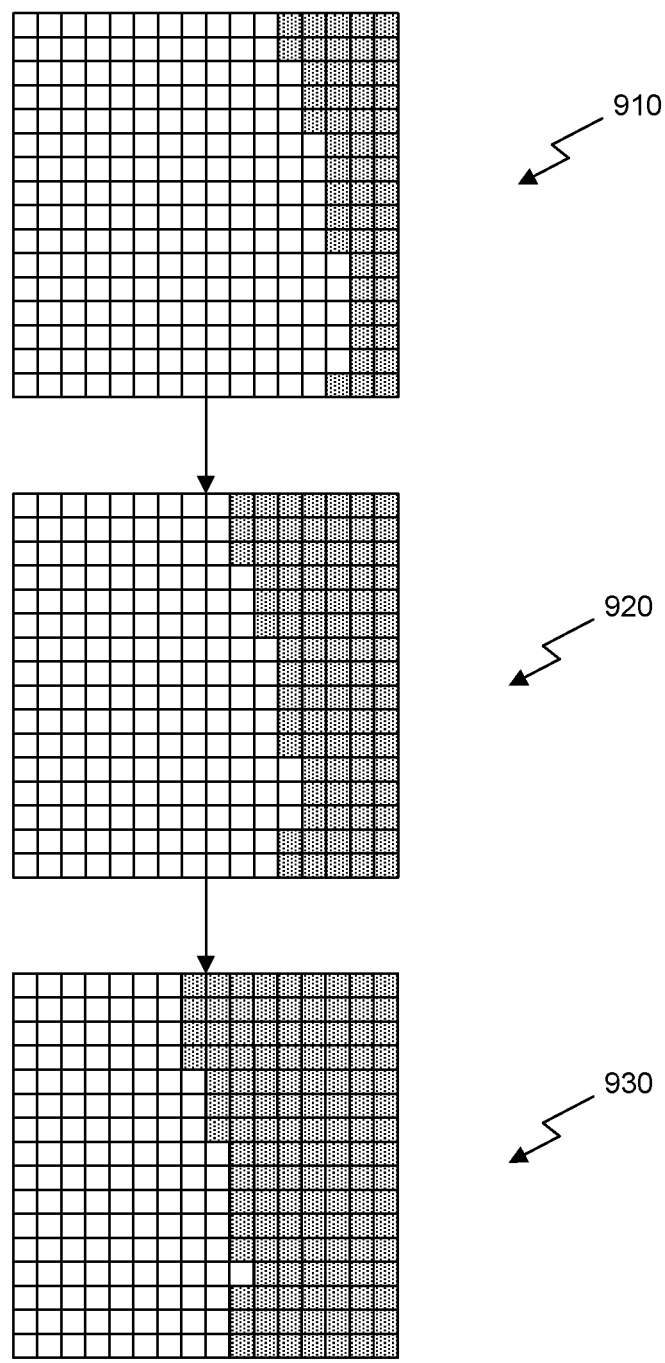
FIG. 9 illustrates the mask update step implemented by the partial convolution layers of the encoder section of the neural network, in accordance with some embodiments.

FIG. 9 illustrates the mask update step implemented by the partial convolution layers of the encoder section of the neural network 210, in accordance with some embodiments. A mask 910 is provided as the input to a stage of the encoder section of the neural network 210. A portion of the mask 910 is depicted in FIG. 9. After the partial convolution operation is completed by the partial convolution layer of the stage, the mask 910 is updated to generate the updated mask 920. In the updated mask 920, many of the pixels identified as invalid in mask 910 have been changed to be identified as valid in updated mask 920. In effect, the edge of the hole has moved by an amount corresponding to the size of the convolution kernel utilized by the partial convolution layer. For example, where a 3×3 convolution kernel was utilized, the edge may move by 1 pixel indicating that the partial convolution operation for an invalid pixel with at least one contiguous valid pixel is now a valid pixel after the partial convolution operation. Where a 5×5 or a 7×7 convolution kernel was utilized, the edge can move by 2 or 3 pixels, respectively, to accommodate the larger receptive fields of the partial convolution operation. As depicted in FIG. 9, the updated mask 920 reflects a 5×5 convolution kernel.

The updated mask 920 is provided as part of the input to the next stage in the encoder section of the neural network 210. Following the partial convolution operation implemented by the partial convolution layer of that stage of the encoder section, the updated mask 920 is updated again to generate updated mask 930. Therefore, each successive stage of the encoder section moves the edge of the hole by a number of pixels.

It will be appreciated that the updated mask 920 and the updated mask 930 are shown for illustration purposes without the down-sampling that is implemented in each encoder stage. In reality, the updated masks will also be down-sampled during the mask update step to match the resolution of the feature maps generated by the partial convolution layer. For example, a convolution operation configured to calculate the updated binary values for the updated mask can be configured to use a stride of 2 to reduce the resolution of the mask by half, in each dimension of the pixel space. In these cases, the size of the holes shrink exponentially with the number of stages. For example, the first mask update step, based on a 5×5 convolution kernel, moves the edge 2 pixels, the next mask update step, based on a 5×5 convolution kernel, moves the edge 4 pixels in the original pixel space, the next mask update step, based on a 5×5 convolution kernel, moves the edge 8 pixels in the original pixel space, and so forth because each mask update step is moving the edge 2 pixels in the down-sampled pixel space. It will also be appreciated that each stage of the encoder section can move the edge of the hole a different number of pixels based on the size of the convolution kernel utilized by that stage. For example, a first stage can update the mask and move the edge by 3 pixels corresponding to a 7×7 convolution kernel, a second stage can update the mask and move the edge by 2 pixels corresponding to a 5×5 convolution kernel, a third stage can update the mask and move the edge by 1 pixel corresponding to a 3×3 convolution kernel, and so forth. It will also be appreciated that the mask may not be updated when a particular stage of the encoder section implements a partial convolution operation utilizing a 1×1 convolution kernel, although such partial convolution operations may be rarely implemented as part of the encoder section of the neural network 210.

Figure 10:
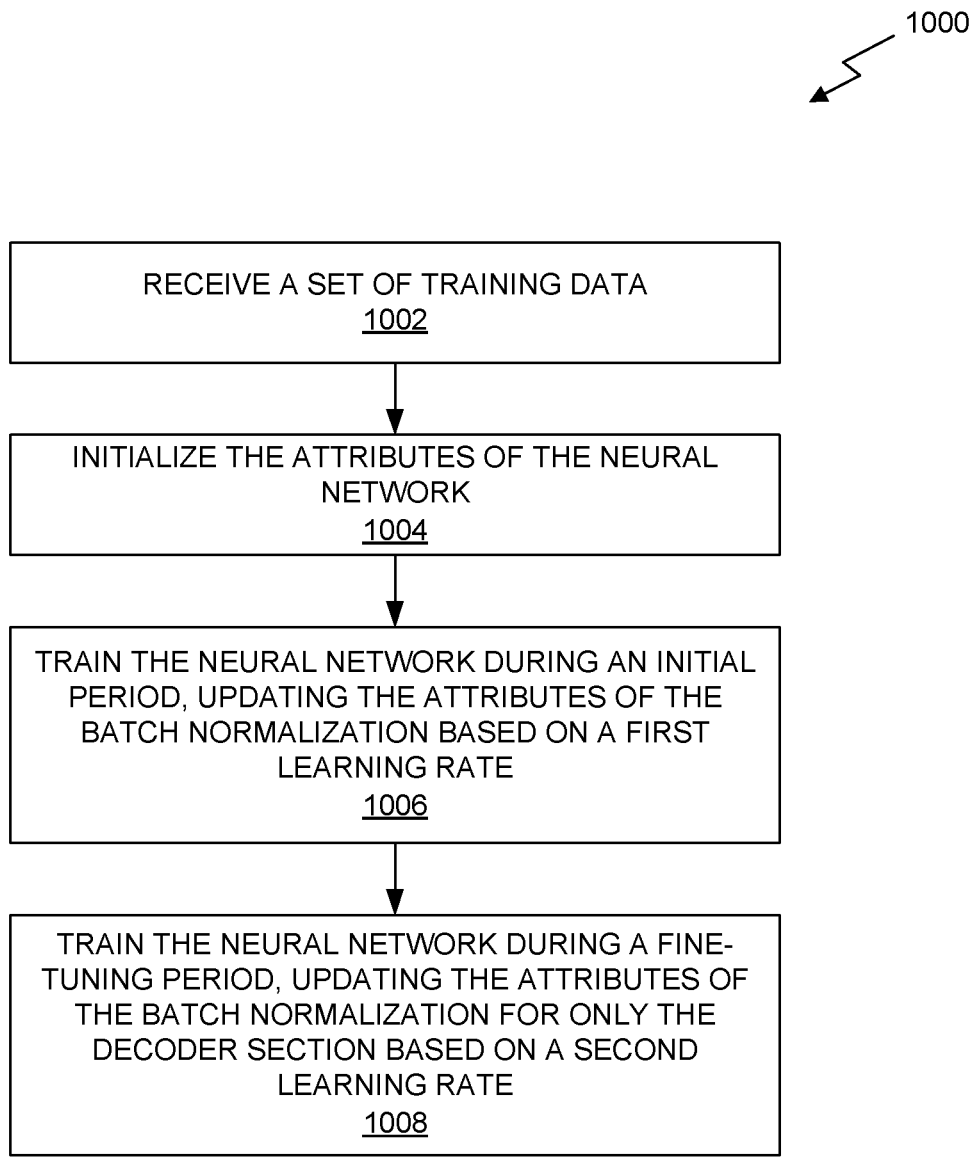
FIG. 10 illustrates a flowchart of a method for training the neural network of FIG. 2, in accordance with some embodiments.

FIG. 10 illustrates a flowchart of a method 1000 for training the neural network 210 of FIG. 2, in accordance with some embodiments. The results that are achieved by the neural network 210 are dependent, to a certain extent, on the ability to effectively train the model to produce realistic images. In one embodiment, given input image $I_{in}$, initial binary mask M, and the predicted image $I_{out}$ generated by the neural network 210, the training primary relies on the computation of the per-pixel $\mathcal{L}_1$ loss for both valid and invalid pixels given by:

$$\mathcal{L}_{hole} = \frac{1}{N_{I_{gt}}} \|(1 - M) \odot (I_{out} - I_{gt})\|, \qquad \text{(Eq. 3)}$$

$$\mathcal{L}_{valid} = \frac{1}{N_{I_{gt}}} \|M \odot (I_{out} - I_{gt})\|, \qquad \text{(Eq. 4)}$$

where $I_{gt}$ is the ground-truth target and $N_{I_{gt}}$ is the number of elements in the ground-truth target. The total loss function used for training can combine the $\mathcal{L}_1$ loss functions of Equations 3 and 4. In one embodiment, the total loss function is a weighted sum of the two $\mathcal{L}_1$ loss functions. In one embodiment, the training data set can comprise tens of thousands or hundreds of thousands of ground truth target images. Each training sample in the training data set includes an input image corresponding to a ground truth target image, where a portion of the pixel data of the input image is invalidated by adding holes to the ground truth target image.

In one embodiment, a number of hole patterns are defined (e.g., thousands of hole patterns) and randomly applied to the ground truth target images to generate the input images. Applying the hole patterns can comprise scaling, rotating, or translating the hole pattern relative to the pixel space of the ground truth image in order to define a mask for the image. The inverse of the mask is used to invalidate (e.g., clear) pixel data for the pixels that are identified by the inverse mask.

In some embodiments, the total loss function can be augmented to account for perceptual loss related to the various feature representations of the neural network 210. More specifically, a perceptual loss function can be defined as a sum of $\mathcal{L}_1$ loss components for each of a number of layers of the neural network 210. Style loss components can be calculated for both the raw output image of the neural network 210 and a compensated output image. In one embodiment, the perceptual loss components can be given by:

$$\mathcal{L}_{p1} = \frac{1}{N_{\psi_l(I_{gt})}} \sum_{l=1}^{L} \|\psi_l(I_{out}) - \psi_l(I_{gt})\|, \quad \text{(Eq. 5)}$$

$$\mathcal{L}_{p2} = \frac{1}{N_{\psi_l(I_{gt})}} \sum_{l=1}^{L} \|\psi_l(I_{comp}) - \psi_l(I_{gt})\|, \quad \text{(Eq. 6)}$$

where $\psi_l(I_i)$ is the feature map from the $l^{th}$ selected layer of the pre-trained neural network 210. The compensated output image, $I_{comp}$, is the raw output image $I_{out}$, but with the non-hole pixels directly set to the ground truth pixels. Therefore, the first component of the perceptual loss function measures the $\mathcal{L}_1$ loss component for the raw output image, and the second component of the perceptual loss function measures the $\mathcal{L}_1$ loss component for the compensated output image, at various layers of the neural network 210. The normalizing factor $$\frac{1}{N_{\psi_l(I_{gt})}}$$

is used such that the perceptual loss components are size-averaged based on the size of the feature maps output by layer l.

In some embodiments, the total loss function can be augmented to account for style loss related to the various feature representations of the neural network 210. More specifically, a style loss function can be defined as a sum of $\mathcal{L}_2$ loss components for each of a number of layers of the neural network 210, where an auto-correction via a Gram matrix K is performed. Style loss components can be calculated for both the raw output image of the neural network 210 and the compensated output image. In one embodiment, the style loss component can be given by:

$$\mathcal{L}_{s1} = \Sigma_{l=1}^{L} \kappa_l \|\psi_l(I_{out})^T \psi_l(I_{out}) - \psi_l(I_{gt})^T \psi_l(I_{gt})\|, \quad \text{(Eq. 7)}$$

$$\mathcal{L}_{s2} = \Sigma_{l=1}^{L} \kappa_l \|\psi_l(I_{comp})^T \psi_l(I_{comp}) - \psi_l(I_{gt})^T \psi_l(I_{gt})\|, \quad \text{(Eq. 8)}$$

where the feature representations are of size $H_l \times W_l \times C_l$, resulting in a Gram matrix is of size $C_l \times C_l$, and where $K_l$ is the normalization factor $1/C_l H_l W_l$ for the $l^{th}$ selected layer.

In some embodiments, the total loss function can be augmented to account for a total variation loss component, which is a smoothing penalty for a region associated with a 1-pixel dilation of the hole region (i.e., around the edge of the hole regions). The total variation loss component is given by:

$$\mathcal{L}_{tv} = \frac{1}{N_{I_{comp}}} \sum \|I_{comp}^{i,j+1} - I_{comp}^{i,j}\| + \frac{1}{N_{I_{comp}}} \sum \|I_{comp}^{i+1,j} - I_{comp}^{i,j}\|, \quad \text{(Eq. 9)}$$

where $N_{I_{comp}}$ is size-averaged based on the number of elements in $I_{comp}$. As used throughout this application, unless clearly contradicted by context or description, the operator $\|x\|$ refers to the l-norm operator which is equivalent to $\Sigma|x|$, (e.g., the sum of absolute value of each element of x).

In one embodiment, the total loss function is a weighted combination of all of the above loss components given by:

$$\mathcal{L}_{total} = \omega_1 \mathcal{L}_{valid} + \omega_2 \mathcal{L}_{hole} + \omega_3 \mathcal{L}_{p1} + \omega_4 \mathcal{L}_{p2} + \omega_5 \mathcal{L}_{s1} + \omega_6 \mathcal{L}_{s2} + \omega_7 \mathcal{L}_{tv}, \quad \text{(Eq. 10)}$$

In one embodiment, the loss term weights $\omega_i$ are determined by performing a hyper-parameter search over 100 validation images. In one exemplary case, appropriate weights for the total loss function are given as:

$$\mathcal{L}_{total} = \mathcal{L}_{valid} + 6\mathcal{L}_{hole} + 0.05(\mathcal{L}_{p1} + \mathcal{L}_{p2}) + 120(\mathcal{L}_{s1} + \mathcal{L}_{s2}) + 0.1\mathcal{L}_{tv}, \quad \text{(Eq. 11)}$$

Returning to the method 1000 of FIG. 10, at step 1002, a set of training data is received. In one embodiment, the set of training data includes a large number of images collected from, e.g., photo databases and/or computer-generated video games. Each training sample in the training data set includes a ground truth target image and an input image that is a version of the ground truth target image including a number of holes. In one embodiment, all training samples have a resolution, in pixel space, of 512×512 pixels. In some embodiments the training data set includes different hole patterns associated with different invalid to valid pixel ratios, when the hole patterns are applied to the image. For example, the ratios of valid pixels to invalid pixels can range between 1 percent to 50 percent, with an equal number of hole patterns in each sub-range defined within the range. At step 1004, the attributes for the neural network 210 are initialized. For example, the attributes (e.g., weights and biases) for the neural network can be set to random values.

At step 1006, the neural network 210 is trained during an initial period based on the total loss function. In one embodiment, the training is performed using a single PPU and a batch size of 6 training samples. Batch normalization can be enabled for both of the encoder sections and the decoder sections of the neural network 210 using a learning rate of 0.0002. Learning rate defines how fast attributes are adjusted based on the magnitude of the total loss value.

At step 1008, the neural network 210 is trained, during a fine-tuning period, based on the total loss function. In one embodiment, all of the attributes of the batch normalization for the encoder section are frozen during the fine-tuning period. However, the attributes of the batch normalization for the decoder section of the neural network 210 can be adjusted during the fine-tuning period.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

What is claimed is:

1. A computer-implemented method comprising:
performing, using a neural network, two or more successive partial convolutions using corresponding masks to generate two or more feature maps that successively increase a number of valid pixels used in each respective partial convolution to at least partially fill one or more holes in one or more images.

2. The method of claim 1, further comprising updating at least one of the corresponding masks subsequent to performing each of the two or more successive of the partial convolutions.

3. The method of claim 2, wherein updating the at least one of the corresponding masks comprises performing a convolution operation on the at least one of the corresponding masks and normalizing a result of the convolution operation.

4. The method of claim 1, wherein the at least one of the two or more successive partial convolutions uses an encoder section and a decoder section, and wherein each stage of the decoder section is connected to an input of a corresponding stage of the encoder section via a skip link.

5. The method of claim 4, wherein each stage of the decoder section comprises an up-sampling layer, a concatenation layer, and a partial convolution layer, and wherein the concatenation layer combines an output of the up-sampling layer with the input of the corresponding stage of the encoder section from the skip link.

6. The method of claim 1, further comprising training one or more neural networks to perform the at least one of the two or more successive partial convolutions based, at least in part, on a total loss function comprising a weighted sum of loss components, to adjust attributes of the one or more neural networks.

7. The method of claim 6, further comprising using two or more neural network layers to perform the successive one or more partial convolutions to cause the one or more holes in the one or more images to be filled based, at least in part, on one or more non-hole regions of the one or more images at each of the two or more neural network layers.

8. A system, comprising:
a memory storing one or more images; and
at least one parallel processing unit coupled to the memory and comprising circuitry to perform, using a neural network, two or more successive partial convolutions using corresponding masks to generate two or more feature maps that successively increase a number of valid pixels used in each respective partial convolution to at least partially fill one or more holes in one or more images.

9. The system of claim 8, wherein the circuitry is to update at least one of the corresponding masks subsequent to performing one or more of the partial convolutions.

10. The system of claim 8, wherein at least one of the two or more successive partial convolutions uses an encoder section and a decoder section, and wherein each stage of the decoder section is connected to an input of a corresponding stage of the encoder section via a skip link.

11. The system of claim 10, wherein each stage of the decoder section comprises an up-sampling layer, a concatenation layer, and a partial convolution layer, and wherein the concatenation layer combines an output of the up-sampling layer with the input of the corresponding stage of the encoder section from the skip link.

12. The system of claim 10, wherein each stage of the encoder section comprises a partial convolution layer configured to apply a convolution kernel to an image of the one or more images in the input, wherein, for each pixel of at least one of the two or more feature maps generated by the partial convolution layer, coefficients in the convolution kernel have been masked by a portion of the mask corresponding to the pixel.

13. The system of claim 12, wherein the partial convolution layer is configured to use a stride greater than one to reduce a resolution of at least one feature map of the two or more feature maps compared to a resolution of an input to the partial convolution layer.

14. The system of claim 8, wherein the circuitry is further to automatically update at least one of the corresponding masks for each layer of the neural network.

15. One or more processors, A processor comprising:
    circuitry to;
    perform, using a neural network, two or more successive partial convolutions using corresponding masks to generate two or more feature maps that successively increase a number of valid pixels used in each respective partial convolution to at least partially fill one or more holes in one or more images.

16. The one or more processors of claim 15, wherein at least one of the two or more successive partial convolutions uses an encoder and a decoder, and wherein each stage of the decoder is connected to an input of a corresponding stage of the encoder via a skip link.

17. The one or more processors of claim 15, wherein at least one of the two or more successive partial convolutions uses a decoder, and wherein each stage of the decoder comprises an up-sampling layer, a concatenation layer, and a partial convolution layer, and wherein the concatenation layer combines an output of an upsampling layer with an input of the corresponding stage of an encoder from a skip link.

18. The one or more processors of claim 15, wherein one or more partial convolution layers provide results to a Leaky Rectified Linear Unit (Leaky ReLU).

19. The one or more processors of claim 15, wherein at least one of the two or more successive partial convolutions uses an encoder, wherein each stage of the encoder comprises a partial convolution layer to apply a convolution kernel to at least one of the one or more images in an input, wherein, of each pixel of at least one feature map of the two or more feature maps generated by the partial convolution layer, coefficients in the convolution kernel are masked by a portion of the mask corresponding to the pixel.

20. The one or more processors of claim 15, wherein one or more partial convolution layers are to use a stride greater than one to reduce a resolution of at least one feature map of the two or more feature maps compared to a resolution of an input to the partial convolution layer.

* * * * *